(12) United States Patent
Pillar et al.

(10) Patent No.: US 6,909,944 B2
(45) Date of Patent: Jun. 21, 2005

(54) VEHICLE CONTROL SYSTEM AND METHOD

(75) Inventors: Duane R. Pillar, Oshkosh, WI (US);
Patrick D. Martin, Appleton, WI (US);
Paul J. Newton, Fremont, WI (US);
Kevin W. Magners, Appleton, WI (US); Michael J. Holeton, Appleton, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 58 days.

(21) Appl. No.: 10/412,596

(22) Filed: Apr. 10, 2003

(65) Prior Publication Data

US 2004/0019414 A1 Jan. 29, 2004

Related U.S. Application Data

(63) Continuation-in-part of application No. 09/927,946, filed on Aug. 10, 2001, which is a continuation-in-part of application No. 09/384,393, filed on Aug. 27, 1999, now Pat. No. 6,421,593, which is a continuation-in-part of application No. 09/364,690, filed on Jul. 30, 1999, now abandoned.

(51) Int. Cl.[7] .......................... B60L 9/00; B60R 16/02; F16D 31/00
(52) U.S. Cl. ................ 701/1; 701/29; 714/13
(58) Field of Search .................... 701/1, 29, 32, 701/33, 34; 361/23, 93.7, 93.8, 93.1; 191/2; 414/699; 714/1, 2, 4, 13

(56) References Cited

U.S. PATENT DOCUMENTS 4,041,470 A 8/1977 Slane et al.
4,162,714 A 7/1979 Correll
4,180,803 A 12/1979 Wesemeyer et al.
4,355,385 A 10/1982 Hampshire et al.

(Continued)

FOREIGN PATENT DOCUMENTS

| EP | 0 266 704 B1 | 5/1988 |
|---|---|---|
| EP | 0 504 913 A1 | 9/1992 |
| EP | 564943 B1 | 10/1993 |
| EP | 791506 A2 | 8/1997 |
| EP | 1 229 636 A2 | 8/2002 |
| SE | 507 046 C2 | 3/1998 |
| WO | WO 95/15594 A1 | 6/1995 |
| WO | WO 97/02965 A1 | 1/1997 |
| WO | WO 98/30961 A1 | 7/1998 |
| WO | WO 00/69662 A1 | 11/2000 |

OTHER PUBLICATIONS

Dana Coporation, Kallamazoo, Michigan, "Dana® Spicer® Central Tire Inflation System Specifications," www.dana.com, May 2000 (2 pages).

(Continued)

*Primary Examiner*—Thomas G. Black
*Assistant Examiner*—Dalena Tran
(74) *Attorney, Agent, or Firm*—Foley & Lardner LLP

(57) ABSTRACT

An interface module for a power distribution and control system for a vehicle is described. The interface module includes at least one first link configured to receive an input from input devices on the vehicle, at least one second link configured to control output devices on the vehicle, at least one third link configured to communicate with a communication network. The module further includes control logic configured to store a record of output devices associated with the interface module and to process a configuration file to determine whether any of the output devices have been designated as controlling a mission critical function.

36 Claims, 10 Drawing Sheets

U.S. PATENT DOCUMENTS

| | | | |
|---|---|---|---|
| 4,516,121 A | | 5/1985 | Moriyama et al. |
| 4,542,802 A | | 9/1985 | Garvey et al. |
| RE32,140 E | | 5/1986 | Tokuda et al. |
| 4,639,609 A | | 1/1987 | Floyd et al. |
| 4,646,232 A | | 2/1987 | Chang et al. |
| 4,744,218 A | * | 5/1988 | Edwards et al. ............... 60/368 |
| 4,760,275 A | | 7/1988 | Sato et al. |
| 4,809,177 A | | 2/1989 | Windle et al. |
| 4,809,803 A | | 3/1989 | Ahern et al. |
| 4,843,557 A | | 6/1989 | Ina et al. |
| 4,864,154 A | | 9/1989 | Copeland et al. |
| 4,864,568 A | * | 9/1989 | Sato et al. ...................... 714/4 |
| 4,894,781 A | | 1/1990 | Sato et al. |
| 4,941,546 A | | 7/1990 | Nist et al. |
| 4,949,808 A | | 8/1990 | Garnett |
| 5,025,253 A | | 6/1991 | DiLullo et al. |
| 5,091,856 A | | 2/1992 | Hasegawa et al. |
| 5,189,617 A | | 2/1993 | Shiraishi |
| 5,365,436 A | | 11/1994 | Schaller et al. |
| 5,416,702 A | | 5/1995 | Kitagawa et al. |
| 5,463,992 A | | 11/1995 | Swenson et al. |
| 5,508,689 A | | 4/1996 | Rado et al. |
| 5,555,171 A | | 9/1996 | Sonehara et al. |
| 5,557,257 A | | 9/1996 | Gieffers |
| 5,623,169 A | | 4/1997 | Sugimoto et al. |
| 5,637,933 A | | 6/1997 | Rawlings et al. |
| 5,638,272 A | | 6/1997 | Minowa et al. |
| 5,657,224 A | | 8/1997 | Lonn et al. |
| 5,670,845 A | | 9/1997 | Grant et al. |
| 5,736,925 A | | 4/1998 | Knauff et al. |
| 5,739,592 A | | 4/1998 | Rigsby et al. |
| 5,754,021 A | | 5/1998 | Kojima |
| 5,793,648 A | | 8/1998 | Nagle et al. |
| 5,794,165 A | | 8/1998 | Minowa et al. |
| 5,819,188 A | | 10/1998 | Vos |
| 5,827,957 A | | 10/1998 | Wehinger |
| 5,845,221 A | | 12/1998 | Hosokawa et al. |
| 5,848,365 A | | 12/1998 | Coverdill |
| 5,864,781 A | | 1/1999 | White |
| 5,884,206 A | | 3/1999 | Kim |
| 5,890,080 A | | 3/1999 | Coverdill et al. |
| 5,896,418 A | | 4/1999 | Hamano et al. |
| 5,919,237 A | | 7/1999 | Balliet |
| 5,948,025 A | | 9/1999 | Sonoda |
| 5,949,330 A | | 9/1999 | Hoffman et al. |
| 5,957,985 A | * | 9/1999 | Wong et al. ................... 701/33 |
| 5,987,365 A | | 11/1999 | Okamoto |
| 5,997,338 A | | 12/1999 | Pohjola |
| 5,999,104 A | | 12/1999 | Symanow et al. |
| 6,012,004 A | | 1/2000 | Sugano et al. |
| 6,038,500 A | | 3/2000 | Weiss |
| 6,096,978 A | | 8/2000 | Pohjola |
| 6,135,806 A | | 10/2000 | Pohjola |
| 6,141,610 A | | 10/2000 | Rothert et al. |
| 6,154,122 A | | 11/2000 | Menze |
| 6,182,807 B1 | * | 2/2001 | Saito et al. ..................... 191/2 |
| 6,223,104 B1 | | 4/2001 | Kamen et al. |
| 6,338,010 B1 | | 1/2002 | Sparks et al. |
| 6,356,826 B1 | | 3/2002 | Pohjola |
| 6,404,607 B1 | * | 6/2002 | Burgess et al. ............... 361/58 |
| 6,421,593 B1 | | 7/2002 | Kempen et al. |
| 6,434,512 B1 | | 8/2002 | Discenzo |
| 6,496,775 B2 | | 12/2002 | McDonald, Jr. et al. |
| 6,501,368 B1 | | 12/2002 | Wiebe et al. |
| 6,553,290 B1 | | 4/2003 | Pillar |
| 6,580,953 B1 | | 6/2003 | Wiebe et al. |
| 6,611,755 B1 | | 8/2003 | Coffee et al. |
| 6,757,597 B2 | | 6/2004 | Yakes et al. |
| 2002/0065594 A1 | | 5/2002 | Squires et al. |
| 2003/0130765 A1 | | 7/2003 | Pillar et al. |
| 2003/0158635 A1 | | 8/2003 | Pillar et al. |
| 2003/0158638 A1 | | 8/2003 | Yakes et al. |
| 2003/0158640 A1 | | 8/2003 | Pillar et al |
| 2003/0163228 A1 | | 8/2003 | Pillar et al. |
| 2003/0163229 A1 | | 8/2003 | Pillar et al. |
| 2003/0163230 A1 | | 8/2003 | Pillar et al. |
| 2003/0171854 A1 | | 9/2003 | Pillar et al. |
| 2003/0195680 A1 | | 10/2003 | Pillar |
| 2003/0200015 A1 | | 10/2003 | Pillar |
| 2004/0002794 A1 | | 1/2004 | Pillar et al. |
| 2004/0024502 A1 | | 2/2004 | Squires et al. |
| 2004/0039510 A1 | | 2/2004 | Archer et al. |
| 2004/0055802 A1 | | 3/2004 | Pillar et al. |
| 2004/0069865 A1 | | 4/2004 | Rowe et al. |

OTHER PUBLICATIONS

Aircraft Internal Time Division Multiplex Data Bus, MIL–STD–1553(USAF); 29 pgs.; (Aug. 30, 1973).

"The One to Count on Through Hell and High Water", 4–page (as photocopied) brochure; Product of Oshkosh Truck Corporation; (Sep. 2000).

"Palletized Load System (PLS)—PLS Potable Water Distributor Module"; 2–page (as photocopied) brochure; Product of Oshkosh Truck Corporation.

"Palletized Load System (PLS)—Concrete Mobile Mixer Module"; 2–page (as photocopied) brochure; Product of Oshkosh Truck Corporation.

"Oshkosh Trucks—75 Years of Specialty Truck Production"; Wright et al.; (pp. 119–126); Motorbooks International Publishers & Wholesalers (1992).

"MTVR Wrecker Variant (MK36 Wrecker Recovery Vehicle)"; 2–page (as photocopied) brochure; Product of Oshkosh Truck Corporation; (Sep.2001).

"MTVR Dump Body Variant (Medium Tactical Vehicle Replacement)"; 2–page (as photocopied) brochure; Product of Oshkosh Truck Corporation; (Sep./2001).

"Medium Tactical Vehicle Replacement"; 6–page (as photocopied) brochure; Product of Oshkosh Truck Corporation; (Aug.2000).

"M1977 CBT (Common Bridge Transporter)"; 2–page (as photocopied) brochure; Product of Oshkosh Truck Corporation.

"M1070F Heavy Equipment Transporter & Trailer"; 8–page (as photocopied) brochure; Product of Oshkosh Truck Corporation; (Sep.2001).

"LVS—Logistic Vehicle System (MK48 Series)"; 6–page document; Product of Oshkosh Truck Corporation.

"LHS Decontamination Mission Module"; 2–page (as photocopied) brochure; Product of Oshkosh Truck Corporation.

"HEMTT—Heavy Expanded Mobility Tactical Truck M977 Series Truck"; 12–page (as photocopied) brochure; Product of Oshkosh Truck Corporation; (Mar.2000).

"Oshkosh Truck's Robotic Truck Qualifies for Pentagon's $1 Million Desert Race," Oshkosh Truck Corp., Mar. 12, 2004 (2 pages).

"Oshkosh Truck Rolls Out Next Generation of Command Zone Advanced Electronics System to Military Market," Oshkosh Truck Corp., Oct. 21, 2002 (2 pages).

"Oshkosh Truck Awarded Contract for U.S. Army Future Tactical Truck Concepts and Technology Evaluations," Oshkosh Truck Corp., Dec. 2, 2003 (2 pages).

"Oshkosh Truck and Ohio State University Design Robotic Vehicle to Compete in Desert Race," Oshkosh Truck Corp., Feb. 11, 2004 (2 pages).

"Oshkosh Showcases ProPulse Hybrid Electric System at Major Defense Exhibition," Oshkosh Truck Corp., Oct. 21, 2002 (1 page).

"Oshkosh Receives Federal Government Funding to Develop ProPulse Alternative Drive System for Military Trucks," Oshkosh Truck Corp., Aug, 31, 2001 (2 pages).

"Oshkosh Demonstrates ProPulse, the First Electric Hybrid—Drive Heavy Defense Truck," Oshkosh Truck Corp., Feb. 27, 2000 (2 pages).

* cited by examiner

VEHICLE CONTROL SYSTEM AND METHOD

CROSS REFERENCE TO RELATED APPLICATIONS

This application is a continuation-in-part of U.S. Ser. No. 09/927,946, pending, filed Aug. 10, 2001, which is a continuation-in-part of U.S. Ser. No. 09/384,393, filed Aug. 27, 1999, now U.S. Pat. No. 6,421,593, issued Jul. 17, 2002, which is a continuation-in-part of U.S. Ser. No. 09/364,690, filed Jul. 30, 1999, abandoned, all of which are hereby incorporated by reference.

BACKGROUND OF THE INVENTION

1. Field of the Invention

The present invention relates to vehicles having interface modules in a control network with distributed I/O interfacing. In a particularly preferred aspect, the invention relates to a vehicle having interface modules in a control network with distributed I/O interfacing, wherein the interface modules are configured to maintain one or more outputs in the event of one or more failures in the control network.

2. Description of Related Art

Fire fighting vehicles, aircraft rescue and fire fighting ("ARFF") vehicles, military vehicles, and other heavy duty vehicles carry a significant amount of electrical and electromechanical equipment that is useful in performing tasks associated with the vehicle. It is common for fire trucks to have well in excess of one hundred individual electrical output devices, especially if the fire truck includes an aerial system.

It has become accepted practice to provide heavy duty vehicles with an additional level of control through the use of interlock systems and/or other control electronics. Interlock systems are used to ensure that one or more predetermined I/O status conditions are met before power is supplied (or continues to be supplied) to a particular output device. For example, many modern fire trucks have control logic to control the vehicles' water pumping function. In order for the pumping function controls logic to allow the vehicle to continue and/or begin pumping water, for example, the interlock system might require that (1) the ignition be turned on, (2) the parking brake be activated, and (3) the transmission be in fourth gear lock-up. The purpose of such an interlock, for example, is to prevent the fire truck from accidentally pumping water while travelling down the road.

Control systems have been developed that allow vehicle output devices to be connected to interface modules which control the output devices and which connect to other system I/O devices via a communication network. Such control systems reduce vehicle wiring and may be used to implement interlocks and other control logic.

However, failure conditions can occur in the any one of a number of components in the control network or associated components. Such failure conditions can include a power glitch that temporarily interrupts power, a component failure, a central controller failure, or any other type of failure. Heavy duty vehicles are often utilized in adverse conditions where the chance of a failure is higher despite efforts to prevent them. Such a failure condition may result in the loss or temporary interruption of data being transmitted to and/or from an electronic module or a central controller.

A failure condition can interfere with control of a function being controlled by an output device. For example, an output device can be controlled to provide a lighting function based on upon receipt of a data transmission. When an interruption of data transmission occurs, the output device can be placed in a default state, usually off, until the failure condition is resolved.

However, some functions should not necessarily be disabled in the event of a failure condition. For a fire truck, the water pumping function is important for extinguishing fire and should not be disabled under normal circumstances. Accordingly, this function can be designated as a mission critical function.

What is needed is a control system that is configured to provide enhanced robustness against failure conditions in connection with mission critical functions. What is further need is such modules that can be configured to operate under a plurality of differing failure conditions based on the nature of the failure condition.

BRIEF SUMMARY OF THE INVENTION

According to a first aspect of the invention, an interface module for a power distribution and control system for a vehicle is described. The interface module includes at least one first link configured to receive an input from input devices on the vehicle, at least one second link configured to control output devices on the vehicle, at least one third link configured to communicate with a communication network. The module further includes control logic configured to store a record of output devices associated with the interface module and to process a configuration file to determine whether any of the output devices have been designated as controlling a mission critical function.

According to a second aspect of the invention, a control method for a vehicle is described. The method includes determining that a failure has occurred in a power distribution and control system having a plurality of interface modules that control output devices located on a vehicle and are coupled to a communication network, determining whether any output devices controlled by one of the plurality of interface modules have been designated as controlling a mission critical function, and controlling at least one output device in accordance with the last known state of the output device based on the determination that a failure has occurred and the determination that the output device has been designated as controlling a mission critical function.

According to a third aspect of the invention, a vehicle is described. The vehicle includes a power distribution and control system. The power distribution and control system includes a plurality of input devices, plurality of output devices, a communication network, and a plurality of microprocessor-based interface modules. The plurality of interface modules are coupled to the plurality of input devices and to the plurality of output devices by way of respective dedicated communication links. The power distribution and control system further includes a microprocessor-based control unit. The control unit is coupled to the plurality of interface modules by way of the communication network and includes a control program that is executable by a microprocessor of the control unit to control the plurality of output devices based on input status information from the plurality of input devices. At least one of the plurality of interface modules is configured to control an output device designated as controlling a mission critical function, such that the output device will function according to its last known state prior to a failure.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION OF THE PREFERRED EMBODIMENTS

A. Fire Truck Control System

For convenience, the contents of U.S. Ser. No. 09/364,690, upon which priority is claimed, are repeated below. The remainder of U.S. Ser. No. 09/364,690 that is not repeated below is hereby incorporated by reference.

1. Architecture of Preferred Fire Truck Control System

Figure 1:
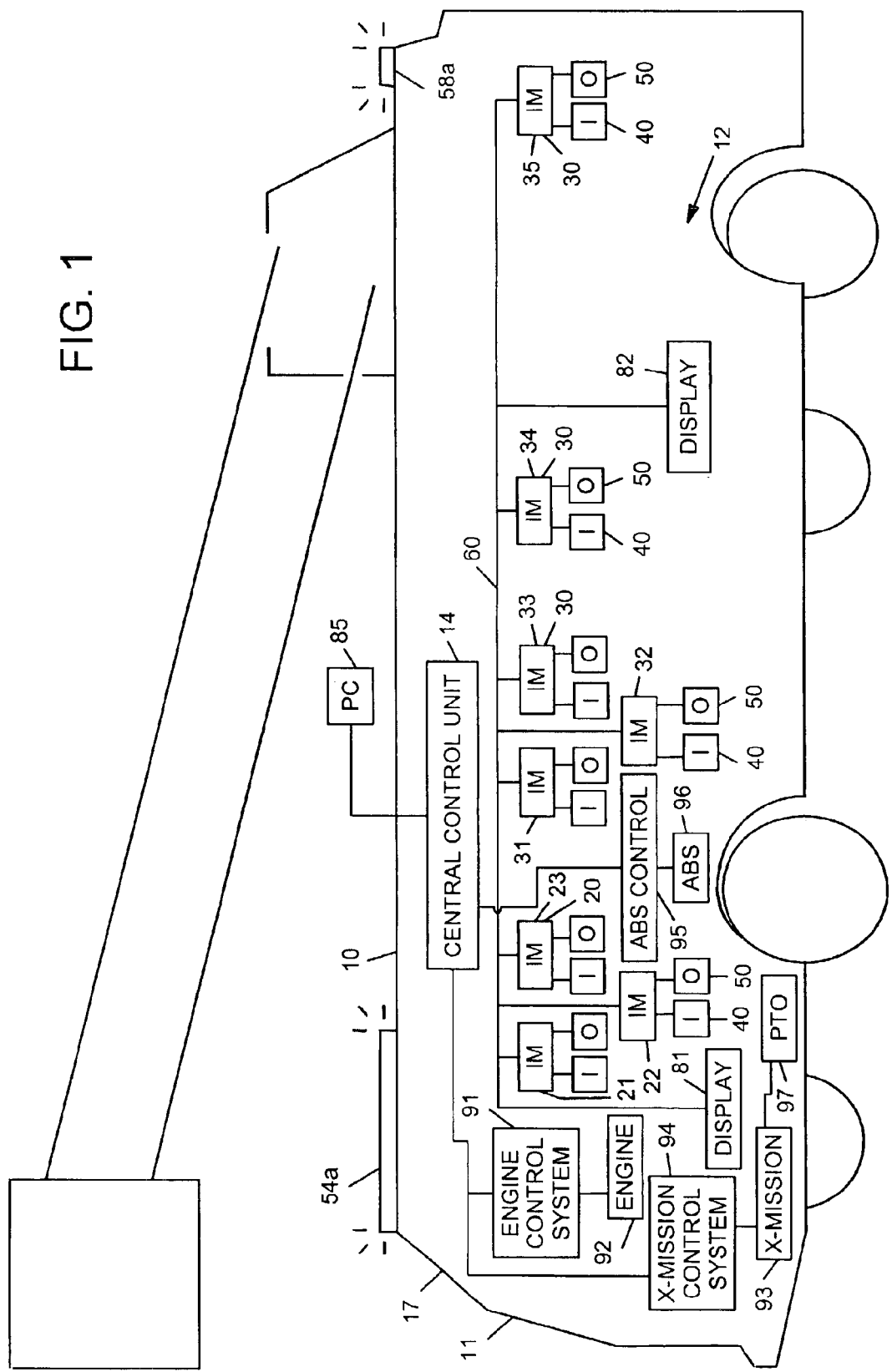
FIG. 1 is a schematic view of a fire truck having a control system according to one embodiment of the present invention.

Referring now to FIG. 1, a preferred embodiment of a fire truck 10 having a control system 12 is illustrated. By way of overview, the control system 12 comprises a central control unit 14, a plurality of microprocessor-based interface modules 20 and 30, a plurality of input devices 40 and a plurality of output devices 50. The central control unit 14 and the interface modules 20 and 30 are connected to each other by a communication network 60.

More specifically, the central control unit 14 is a microprocessor-based device and includes a microprocessor 15 that executes a control program 16 (see FIG. 2) stored in memory of the central control unit 14. The control program is shown and described in greater detail below in conjunction with the flowcharts of FIGS. 4 and 5. In general, the control unit 14 executes the program to collect and store input status information from the input devices 40, and to control the output devices 50 based on the collected status information. The control program preferably also implements an interlock system (e.g., see FIG. 5). As described below, the central control unit 14 is preferably not connected to the I/O devices 40 and 50 directly but rather only indirectly by way of the interface modules 20 and 30, thereby enabling distributed data collection and power distribution. The I/O devices 40 and 50 are located on a chassis 11 of the fire truck 10, which includes both the body and the underbody of the fire truck 10.

In the illustrated embodiment, two different types of interface modules are used. The interface modules 20 interface mainly with switches and low power indicators, such as LEDs that are integrally fabricated with a particular switch and that are used to provide visual feedback to an operator regarding the state of the particular switch. Herein, the reference numeral "20" is used to refer to the interface modules 20 collectively, whereas the reference numerals 21, 22 and 23 are used to refer to specific ones of the interface modules 20.

The interface modules 30 interface with the remaining I/O devices 40 and 50 on the vehicle that do not interface to the interface modules 20. The interface modules 30 are distinguishable from the interface modules 20 mainly in that the interface modules 30 are capable of handling both analog and digital inputs and outputs, and in that they are capable of providing more output power to drive devices such as gauges, valves, solenoids, vehicle lighting and so on. The analog outputs may be true analog outputs or they may be pulse width modulation outputs that are used to emulate analog outputs. Herein, the reference numeral "30" is used to refer to the interface modules 30 collectively, whereas the reference numerals 31, 32, 33, 34 and 35 are used to refer to specific ones of the interface modules 30.

Although two different types of interface modules are used in the illustrated embodiment, depending on the application, it may be desirable to use only a single type of interface module in order to reduce inventory requirements. Alternatively, it may be desirable to use a larger number of different types of interface modules that are more optimized to meet particular needs. Additionally, while in FIG. 1 three of the interface modules 20 and five of the interface modules 30 are shown, this arrangement is again simply one example. It may be desirable to provide each interface module with more I/O points in order to reduce the number of interface modules that are required, or to use more interface modules with a smaller number of I/O points in order to make the control system 12 more highly distributed. Of course, the number of interface modules will also be affected by the total number of I/O points in the control system.

FIG. 1 shows an approximate distribution of the interface modules 20 and 30 throughout the fire truck 10. In general, in order to minimize wiring, the interface modules 20 and 30 are placed so as to be located as closely as possible to the input devices 40 from which input status information is received and the output devices 50 that are controlled. As shown in FIG. 1, there is a large concentration of interface modules 20 and 30 near the front of the fire truck 10, with an additional interface module 34 at mid-length of the fire truck 10 and another interface module 35 at the rear of the fire truck 10. The large concentration of interface modules 20 and 30 at the front of the fire truck 10 is caused by the large number of switches (including those with integral LED feedback output devices) located in a cab of the fire truck 10, as well as the large number of other output devices (gauges, lighting) which tend to be located in the cab or otherwise near the front of the fire truck 10. The interface module 34 that is located in the middle of the truck is used in connection with I/O devices 40 and 50 that are located at the fire truck pump panel (i.e., the operator panel that has I/O devices for operator control of the fire truck's pump system). The interface module 35 that is located at the rear of the fire truck 10 is used in connection with lighting and other equipment at the rear of the fire truck 10.

Figure 2:
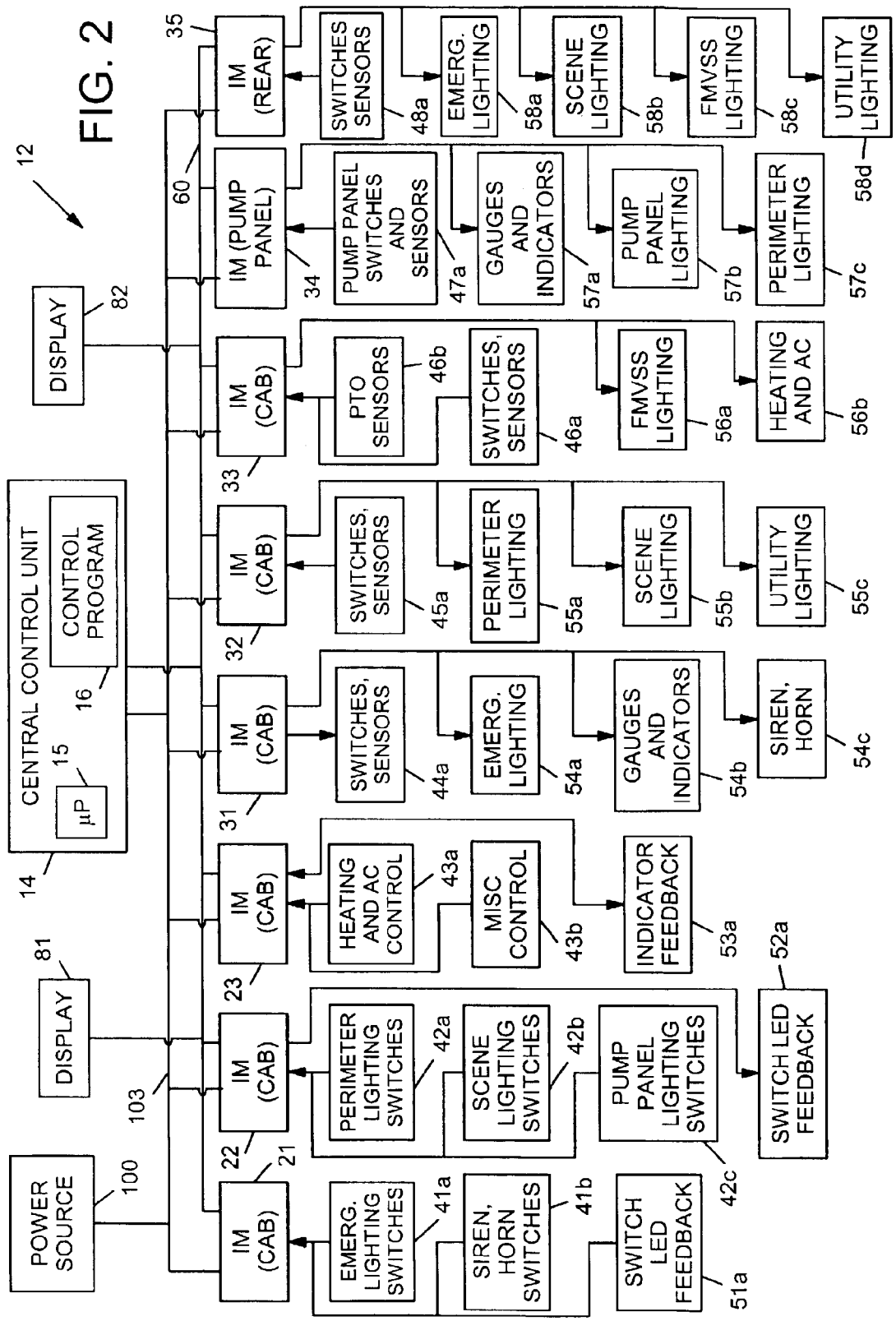
FIG. 2 is a block diagram of the control system of FIG. 1 showing selected aspects of the control system in greater detail.

The advantage of distributing the interface modules 20 and 30 in this manner can be more fully appreciated with reference to FIG. 2, which shows the interconnection of the interface modules 20 and 30. As shown in-FIG. 2, the interface modules 20 and 30 receive power from a power source 100 by way of a power transmission link 103. The power transmission link 103 may comprise for example a single power line that is routed throughout the fire truck 10 to each of the interface modules 20 and 30. The interface modules then distribute the power to the output devices 50, which are more specifically designated with the reference numbers 51a, 52a, 53a, 54a–c, 55a–c, 56a–b, 57a–c and 58a–d in FIG. 2.

It is therefore seen from FIGS. 1 and 2 that the relative distribution of the interface modules 20 and 30 throughout the fire truck 10 in combination with the arrangement of the power transmission link 103 allows the amount of wiring on the fire truck 10 to be dramatically reduced. The power source 100 delivers power to the interface modules 20 and 30, which act among other things as power distribution centers, and not directly to the output devices 50. Because the interface modules 20 and 30 are located so closely to the I/O devices 40 and 50, most of the I/O devices can be connected to the interface modules 20 and 30 using only a few feet of wire or less. This eliminates the need for a wire harness that extends the length of the fire truck (about forty feet) to establish connections for each I/O devices 40 and 50 individually.

Continuing to refer to FIG. 2, the switch interface modules 20 and the interconnection of the interface modules 20 with various I/O devices will now be described in greater detail. The interface modules 20 are microprocessor-based, as previously noted, and include a microprocessor that executes a program to enable communication over the communication network 60, as detailed below.

The same or a different microprocessor of the interface modules 20 may also be used to process input signals received from the input devices 40. In particular, the interface modules 20 preferably perform debounce filtering of the switch inputs, so as to require that the position of the switch become mechanically stable before a switch transition is reported to the central control unit 14. For example, a delay of fifty milliseconds may be required before a switch transition is reported. Performing this filtering at the interface modules 20 reduces the amount of processing that is required by the central control unit 14 to interpret switch inputs, and also reduces the amount of communication that is required over the communication network 60 because each switch transition need not be reported.

Physically, the interface modules 20 may be placed near the headliner of a cab 17 of the fire truck 10. Traditionally, it is common practice to locate panels of switches along the headliner of the cab for easy access by an operator of the fire truck. Additionally, as detailed below, in the preferred embodiment, the interface modules 20 are connected to switches that have integrally fabricated LEDs for indicating the state of the output device controlled by the switch to provide maximum operator feedback. These LEDs are output devices which are connected to the interface modules 20.

Therefore, by locating the interface modules near the headliner of the cab, the amount of wiring required to connect the interface modules 20 not only to the switches and but also to the LED indicators is reduced.

In the preferred embodiment, the interface modules 20 have between ten and twenty-five each of inputs and outputs and, more preferably, have sixteen digital (on/off switch) inputs and sixteen LED outputs. Most of these inputs and outputs are utilized in connection with switches having integrally fabricated LEDs. However, it should be noted that there need not be a one-to-one correspondence between the switches and the LEDs, and that the inputs and the outputs of the interface modules 20 need not be in matched pairs. For example, some inputs may be digital sensors (without a corresponding output device) and some of the outputs may be ordinary digital indicators (without a corresponding input device). Additionally, the LED indicators associated with the switch inputs for the interface module 21 could just as easily be driven by the interface module 23 as by the interface module 21, although this arrangement is not preferred. Of course, it is not necessary that all of the inputs and outputs on a given interface module 20 be utilized and, in fact, it is likely that some will remain unutilized.

One way of establishing a dedicated link between the I/O devices 40 and 50 and the interface modules 20 is through the use of a simple hardwired link. Considering for example an input device which is a switch, one terminal of the switch may be connected (e.g., by way of a harness connector) to an input terminal of the interface module 20 and the other terminal of the switch may be tied high (bus voltage) or low (ground). Likewise, for an output device which is an LED, one terminal of the LED may be connected to an output terminal of the interface module 20 and the other terminal of the LED may again be tied high or low. Other dedicated links, such as RF links, could also be used.

To provide maximum operator feedback, the LEDs that are located with the switches have three states, namely, off, on, and blinking. The off state indicates that the switch is off and therefore that the device controlled by the switch is off. Conversely, the on state indicates that the switch is on and that the device controlled by the switch is on. The blinking state indicates that the control system 12 recognizes that a switch is on, but that the device which the switch controls is nevertheless off for some other reason (e.g., due to the failure of an interlock condition, or due to the operation of the load manager or load sequencer). Notably, the blinking LED feedback is made possible by the fact that the LEDs are controlled by the control unit 14 and not directly by the switches themselves, since the switches themselves do not necessarily know the output state of the devices they control.

A specific example will now be given of a preferred interconnection of the interface modules 21, 22, and 23 with a plurality of I/O devices 40 and 50. Many or all of the I/O devices 40 and 50 could be the same as those that have previously been used on fire trucks. Additionally, it should be noted that the example given below is just one example, and that a virtually unlimited number of configurations are possible. This is especially true since fire trucks tend to be sold one or two at a time and therefore each fire truck that is sold tends to be unique at least in some respects.

In FIG. 2, the interface module 21 receives inputs from switches 41a that control the emergency lighting system of the fire truck. As previously noted, the emergency lighting system includes the flashing emergency lights (usually red and white) that are commonly associated with fire trucks and that are used to alert other motorists to the presence of the fire truck on the roadway or at the scene of a fire. One of the switches 41a may be an emergency master on/off (E-master) switch used to initiate load sequencing, as described in greater detail below. The interface module 21 may also be connected, for example, to switches 41b that control the emergency siren and horn. The interface module 21 is also connected to LEDs 51a that are integrally located in the switches 41a and 41b and that provide operator feedback regarding the positions of the switches 41a and 41b, as previously described.

The interface module 22 receives inputs from switches 42a that control lighting around the perimeter of the fire truck 10, switches 42b that control scene lighting, and switches 42c that control lighting which aids the operators in viewing gauges and other settings at the pump panel. The interface module 22 is also connected to LEDs 52a that are integrally located in the switches 42a, 42b and 42c and that provide operator feedback regarding the positions of the switches 42a, 42b and 42c.

The interface module 23 receives inputs from switches 43a that control heating and air conditioning, and switches 43b that controls miscellaneous other electrical devices. The interface module 23 is connected to LED indicators, some of which may be integrally located with the switches 43a and 43b and others of which may simply be an LED indicator that is mounted on the dashboard or elsewhere in the cab of the fire truck 10.

Continuing to refer to FIG. 2, the vehicle interface modules 30 and the interconnection of the interface modules 20 with various I/O devices will now be described in greater detail. As previously mentioned, the interface modules 30 are distinguishable from the interface modules 20 mainly in that the interface modules 30 are capable of handling both analog and digital inputs and outputs, and in that they are capable of providing more output power to drive output devices such as digitally-driven gauges, solenoids, and so on. The interface modules 30 preferably have between fifteen and twenty-five each inputs and outputs and, more preferably, have twenty inputs (including six digital inputs, two frequency counter inputs, and six analog inputs) and twenty outputs (including six outputs that are configurable as analog outputs). Further, interface modules 30 and/or 20 may be configured to include only inputs or only outputs.

Like the interface modules 20, the interface modules 30 are microprocessor-based and include a microprocessor that executes a program to enable communication over the communication network 60. The same or a different microprocessor of the interface modules 30 may also be used to process input signals received from the input devices 40 and to process output signals transmitted to the output devices 50.

For the interface modules 30, this processing includes not only debounce filtering, in the case of switch inputs, but also a variety of other types of processing. For example, for analog inputs, this processing includes any processing that is required to interpret the inputs from analog-to-digital (A/D) converters, including converting units. For frequency inputs, this processing includes any processing that is required to interpret inputs from frequency-to-digital converters, including converting units. This processing also includes other simple filtering operations. For example, in connection with one analog input, this processing may include notifying the central control unit 14 of the status of an input device only every second or so. In connection with another analog input, this processing may include advising the central control unit 14 only when the status of the input device changes by a predetermined amount. For analog output devices, this processing includes any processing that is required to interpret the outputs for digital-to-analog (D/A) converters, including converting units. For digital output devices that blink or flash, this processing includes implementing the blinking or flashing (i.e., turning the output device on and off at a predetermined frequency) based on an instruction from the central control unit 14 that the output device should blink or flash. In general, the processing by the interface modules 30 reduces the amount of information which must be communicated over the communication link, and also reduces the amount of time that the central control unit 14 must spend processing minor changes in analog input status.

Preferably, the configuration information required to implement the I/O processing that has just been described is downloaded from the central control unit 14 to each interface module 30 (and each interface module 20) at power-up. Additionally, the harness connector that connects to each of the interface modules 20 and 30 are preferably electronically keyed, such that being connected to a particular harness connector provides the interface modules 20 and 30 with a unique identification code (for example, by tying various connector pins high and low to implement a binary code). The advantage of this approach is that the interface modules 20 and 30 become interchangeable devices that are customized only at power-up. As a result, if one of the interface modules 30 malfunctions, for example, a new interface module 30 can be plugged into the control system 12, customized automatically at power-up (without user involvement), and the control system 12 then becomes fully operational. This enhances the maintainability of the control system 12.

A specific example will now be given of a preferred interconnection of the interface modules 31, 32, and 33 with a plurality of I/O devices 40 and 50. This example continues the example that was started in connection with the interface modules 21, 22, and 23. Again, it should be noted that the configuration described herein is just one example.

The interface modules 31, 32, 33, 34 and 35 all receive inputs from additional switches and sensors 44a, 45a, 46a, 47a and 48a. The switches may be additional switches that are located in the cab of the fire truck or elsewhere throughout the vehicle, depending on the location of the interface module. The sensors may be selected ones of a variety of sensors that are located throughout the fire truck. The sensors may be used to sense the mechanical status of devices on the fire truck, for example, whether particular devices are engaged or disengaged, whether particular devices are deployed, whether particular doors on the fire truck are open or closed, and so on. The sensors may also be used to sense fluid levels such as fuel level, transmission fluid level, coolant level, foam pressure, oil level, and so on.

In addition to the switches and sensors 44a, the interface module 31 is also connected to a portion 54a of the emergency lighting system. The emergency lighting system includes emergency lights (usually red and white) at the front, side and rear of the fire truck 10. The emergency lights may, for example, be in accordance with the guidelines provided by the National Fire Protection Association. Because the interface module 31 is located at the front of the fire truck, the interface module 31 is connected to the red and white emergency lights at the front of the fire truck.

The interface module 31 is also connected to gauges and indicators 54b which are located on the dashboard of the fire truck 10. The gauges may indicate fluid levels such as fuel level, transmission fluid level, coolant level, foam pressure, oil level and so on. The indicators may include, for example, indicators that are used to display danger, warning and caution messages, warning lights, and indicators that indicate the status of various mechanical and electrical systems on the fire truck. The interface module 31 may also be connected, for example, to an emergency sound system including an emergency siren and emergency air horns 54c, which are used in combination with the emergency lights 54a.

In addition to the switches and sensors 45a, the interface module 32 is also connected to perimeter lighting 55a, scene lighting 55b and utility lighting 55c. The perimeter lighting 55a illuminates the perimeter of the fire truck 10. The scene lighting 55b includes bright flood lights and/or spot lights to illuminate the work area at a fire. The utility lighting 55c includes lighting used to light operator panels, compartments and so on of the fire truck 10.

In addition to the switches and sensors 46a, the interface module 33 is also connected to PTO sensors 46b. The PTO sensors 46b monitor the status of a power take-off mechanism 97 (see FIG. 1), which diverts mechanical power from the engine/transmission from the wheels to other mechanical subsystems, such as the pump system, an aerial system and so on. The interface module 33 is also connected to a portion 56a of the FMVSS (Federal Motor Vehicle Safety Standard) lighting. The FMVSS lighting system includes the usual types of lighting systems that are commonly found on most types of vehicles, for example, head lights, tail lights, brake lights, directional lights (including left and right directionals), hazard lights, and so on. The interface module 33 is also connected to the heating and air conditioning 56b.

In addition to the switches and sensors 47a, the interface module 34, which is disposed near the pump panel, is connected to pump panel switches and sensors 47a, pump panel gauges and indicators 57a, pump panel lighting 57b, and perimeter lighting 57c. The pump system may be manually controlled or may be automatically controlled through the use of electronically controlled valves. In either case, the various fluid pressures are measured by sensors and displayed on the gauges and indicators 57a.

Finally, in addition to the switches and sensors 48a, the interface module 35 is also connected to emergency lighting 58a, scene lighting 58b, FMVSS lighting 58c, and the utility lighting 58d. These lighting systems have been described above.

The interface modules 20 and the interface modules 30 are connected to the central control unit 14 by the communication network 60. The communication network may be implemented using a network protocol, for example, which is in compliance with the Society of Automotive Engineers (SAE) J1708/1587 and/or J1939 standards. The particular network protocol that is utilized is not critical, although all of the devices on the network should be able to communicate effectively and reliably.

The transmission medium may be implemented using copper or fiber optic cable. Fiber optic cable is particularly advantageous in connection with fire trucks because fiber optic cable is substantially immune to electromagnetic interference, for example, from communication antennae on mobile news vehicles, which are common at the scenes of fires. Additionally, fiber optic cable is advantageous because it reduces RF emissions and the possibility of short circuits as compared to copper-based networks. Finally, fiber optic cable is advantageous because it reduces the possibility of electrocution as compared to copper in the event that the cable accidentally comes into contact with power lines at the scene of a fire.

Also connected to the communication network 60 are a plurality of displays 81 and 82. The displays 81 and 82 permit any of the data collected by the central control unit 14 to be displayed to the firefighters in real time. In practice, the data displayed by the displays 81 and 82 may be displayed in the form of text messages and may be organized into screens of data (given that there is too much data to display at one time) and the displays 81 and 82 may include membrane pushbuttons that allow the firefighters to scroll through, page through, or otherwise view the screens of data that are available. Additionally, although the displays 81 and 82 are both capable of displaying any of the information collected by the central control unit 14, in practice, the displays 81 and 82 are likely to be used only to display selected categories of information. For example, assuming the display 81 is located in the cab and the display 82 is located at the pump panel, the display 81 is likely to be used to display information that pertains to devices which are controlled from within the cab, whereas the display 82 is likely to be used to display information pertaining to the operation of the pump panel. Advantageously, the displays 81 and 82 give firefighters instant access to fire truck information at a single location, which facilitates both normal operations of the fire truck as well as troubleshooting if problems arise.

Also shown in FIG. 2 is a personal computer 85 which is connected to the control unit 14 by way of a communication link 86, which may be a modem link, an RS-232 link, an internet link, and so on. The personal computer 85 allows diagnostic software to be utilized for remote or local troubleshooting of the control system 12, for example, through direct examination of inputs, direct control of outputs, and viewing and controlling internal states, including interlock states. Because all I/O status information is stored in the central control unit 14, this information can be easily accessed and manipulated by the personal computer 85. If a problem is encountered, the personal computer can be used to determine whether the central control unit 14 considers all of the interface modules 20 and 30 to be "on-line" and, if not, the operator can check for bad connections and so on. If a particular output device is not working properly, the personal computer 85 can be used to trace the I/O status information from the switch or other input device through to the malfunctioning output device. For example, the personal computer 85 can be used to determine whether the switch state is being read properly, whether all interlock conditions are met, and so on.

The personal computer 85 also allows new firmware to be downloaded to the control unit 14 remotely (e.g., from a different city or state by way of the internet or a telephone link) by way of the communication link 86. The firmware can be firmware for the control unit 14, or it can be firmware for the interface modules 20 and 30 that is downloaded to the control unit 14 and then transmitted to the interface modules 20 and 30 by way of the communication network 60.

Finally, referring back to FIG. 1, several additional systems are shown which will now be briefly described before proceeding to a discussion of the operation of the control system 12. In particular, FIG. 1 shows an engine system including an engine 91 and an engine control system 92, a transmission system including a transmission 93 and a transmission control system 94, and an anti-lock brake system including an anti-lock brake control system 95 and anti-lock brakes 96. The transmission 93 is mechanically coupled to the engine 91, and is itself further mechanically coupled to a PTO system 97. The PTO system 97 allows mechanical power from the engine to be diverted to water pumps, aerial drive mechanisms, stabilizer drive mechanisms, and so on. In combination, the engine system, the transmission system and the PTO system form the power train of the fire truck 10.

The control systems 92, 94 and 95 may be connected to the central control unit 14 using the same or a different communication network than is used by the interface modules 30 and 40. In practice, the control systems 92, 94 and 95 are likely to be purchased as off-the-shelf systems, since most fire truck manufacturers purchase rather than manufacture engine systems, transmission systems and anti-lock brake systems. As a result, it is likely that the control systems 92, 94 and 95 will use a variety of different communication protocols and therefore that at least one additional communication network will be required.

By connecting the systems 92, 94 and 95 to the central control unit 14, an array of additional input status information becomes available to the control system 12. For example, for the engine, this allows the central control unit 14 to obtain I/O status information pertaining to engine speed, engine hours, oil temperature, oil pressure, oil level, coolant level, fuel level, and so on. For the transmission, this allows the central control unit 14 to obtain, for example, information pertaining transmission temperature, transmission fluid level and/or transmission state (1st gear, 2nd gear, and so on). Assuming that an off-the-shelf engine or transmission system is used, the information that is available depends on the manufacturer of the system and the information that they have chosen to make available.

Connecting the systems 92, 94 and 95 to the central control unit 14 is advantageous because it allows information from these subsystems to be displayed to firefighters using the displays 81 and 82. This also allows the central control unit 14 to implement various interlock conditions as a function of the state of the transmission, engine or brake systems. For example, in order to turn on the pump system (which is mechanically driven by the engine and the transmission), an interlock condition may be implemented that requires that the transmission be in neutral or 4th lockup (i.e., fourth gear with the torque converter locked up), so that the pump can only be engaged when the wheels are disengaged from the power train. The status information from these systems can therefore be treated in the same manner as I/O status information from any other discrete I/O device on the fire truck 10. It may also be desirable to provide the central control unit 14 with a limited degree of control over the engine and transmission systems, for example, enabling the central control unit 14 to issue throttle command requests to the engine control system 91. This allows the central control unit to control the speed of the engine and therefore the voltage developed across the alternator that forms part of the power source 100.

2. Manner of Operation of Preferred Fire Truck Control System

The operation of the control system 12 will now be described in greater detail, including the manner in which interlock control, load management, and load sequencing are implemented by the control system 12.

a. Operation Overview and Interlock Control

Figure 3:
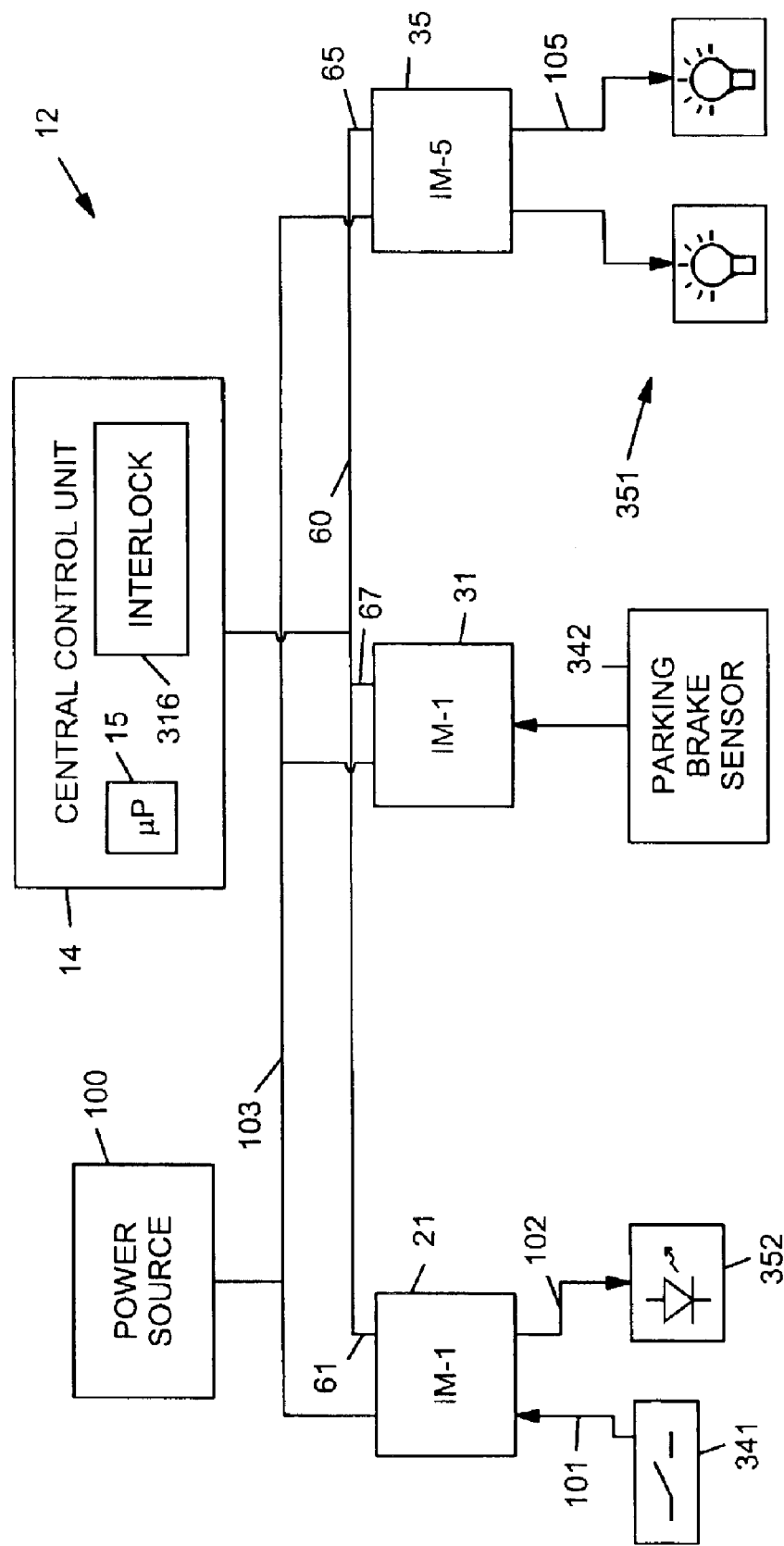
FIG. 3 is a simplified block diagram of the control system of FIGS. 1–2.
Figure 4:
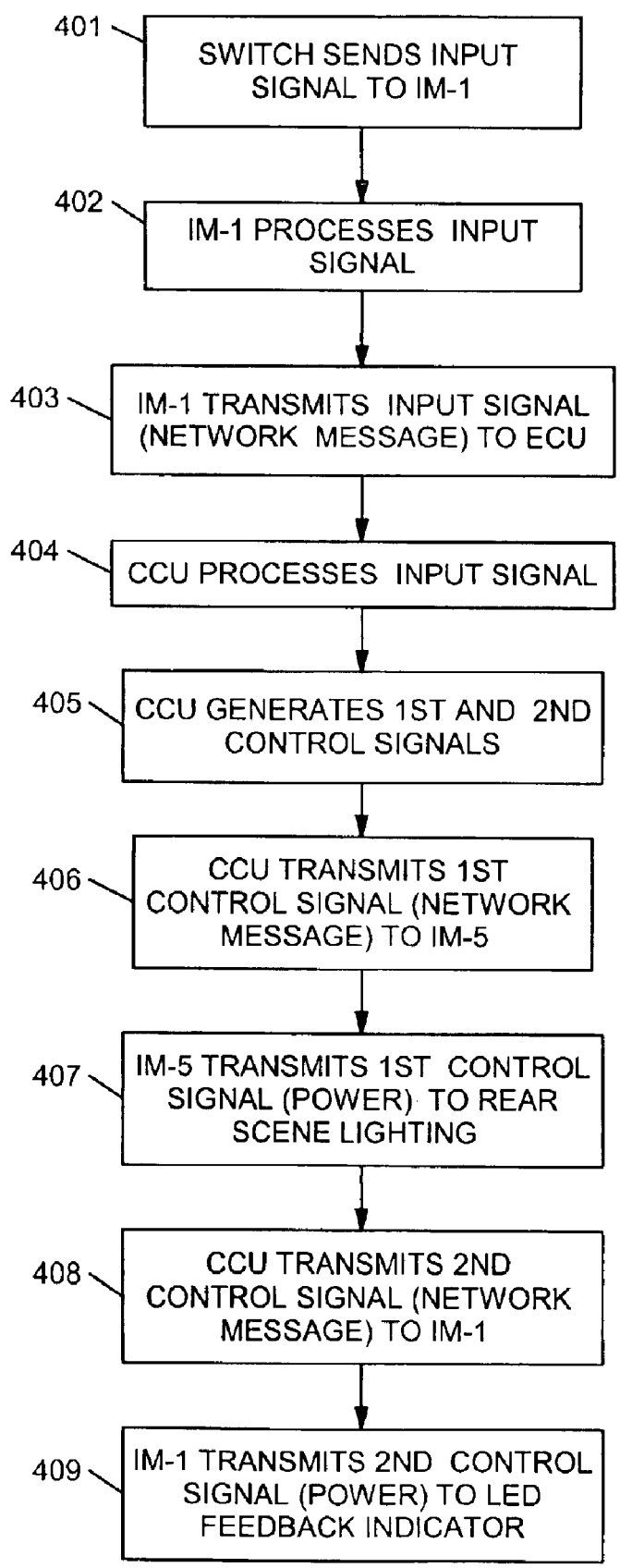
FIG. 4 is a flowchart showing the operation of the control system of FIG. 3 to turn on an output device in response to an operator input.
Figure 5:
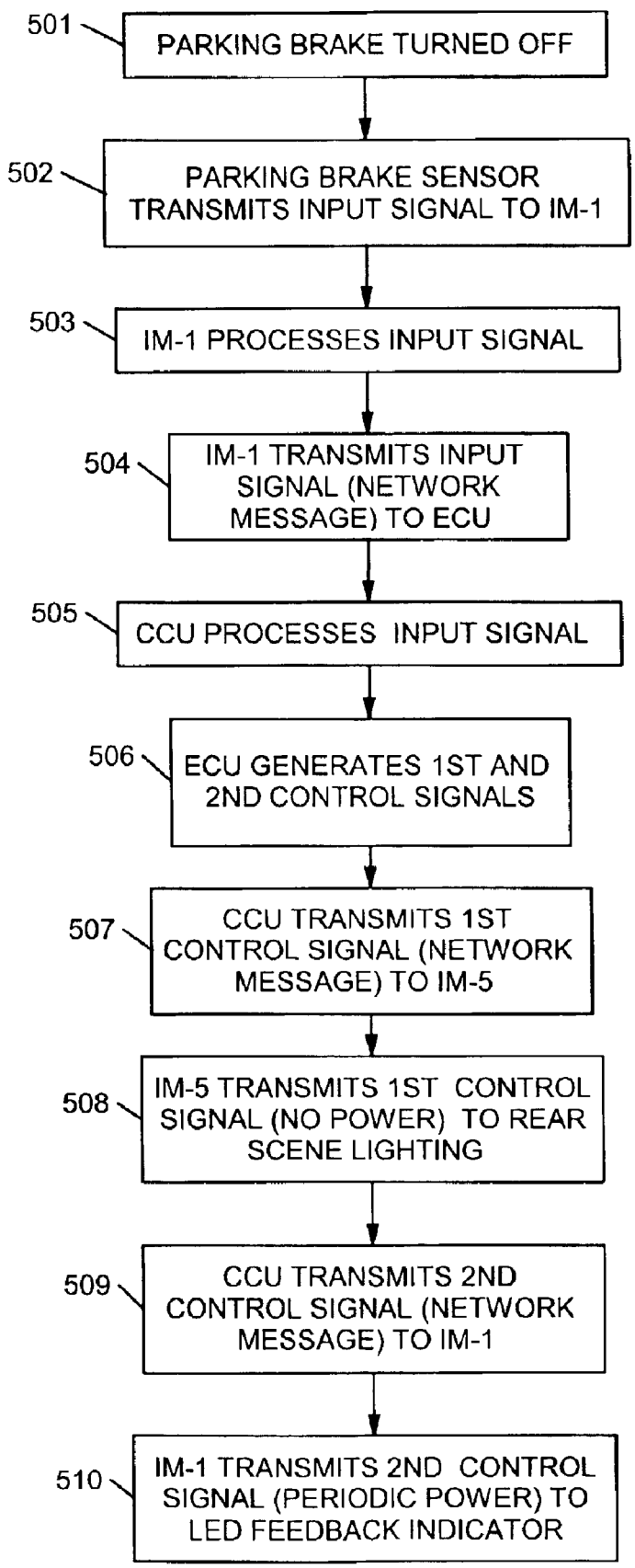
FIG. 5 is a flowchart showing the operation of the control system of FIG. 3 to turn off an output device in response to the failure of an interlock condition.

Referring now to FIGS. 3–5, a first example of the operation of the control system 12 is given. FIG. 3 is a block diagram of the control system 12, which has been simplified to the extent that some of the structure shown in FIGS. 1–2 is not shown in FIG. 3. Additionally, FIG. 3 shows in greater detail a switch 341 (which is one of the switches 41a in FIG. 2), rear scene lights 351 (which are part of the rear scene lighting 58b in FIG. 2), and an LED indicator 352 (which is one of the switch LED feedback indicators 51a in FIG. 2).

The rear scene lights 351 are considered a single output device since they are both connected to one output of the interface module 35, even though there are in fact two lights. Finally, the central control unit 14 is also shown to include an interlock system 316, which is implemented in the control program 16 executed by the microprocessor 15.

FIG. 4 is a flowchart showing the operation of the control system 12 to activate the rear scene lights 351 in response to an input signal received from the switch 341. One of the advantages of the control system 12 is that input signals from the input devices 40 are processed by the control unit 14 and do not directly control the output devices 50. Switches represent user input commands but do not close the electrical circuit between the power source 100 and the output device controlled by the switch. As will be described below, this simplifies control system wiring and makes possible more flexible control of output devices.

In order to highlight this aspect of the control system 12, it will be assumed that the switch 341 is a soft toggle switch. Thus, the switch 341 is physically a momentary switch, i.e., a switch that closes when pressed but, when pressure is removed, automatically returns to an open position. The control system 12 makes the switch 341 emulate a latched switch, i.e., a switch that remains closed when pressed and returns to an open position only when pressed again.

First, in step 401, the switch 341 transmits an input signal to the interface module 21. The input signal is transmitted to the interface module 21 as a result of a change in the status of the switch, for example, when an operator presses the switch. The input signal from the switch 341 is transmitted to the interface module 21 by way of a hardwired communication link 101 which may, for example, comprise a wire that connects a terminal of the switch 341 to an input terminal of the interface module 21 (with the other terminal of the switch 341 being tied high or low). Other types of dedicated links may also be used.

At step 402, the interface module 21 processes the input signal. For the switch 341, the interface module performs debounce filtering, for example, by waiting until the mechanical position of the switch stabilizes (e.g., fifty milliseconds) before the transmitting the input signal to the control unit 14.

At step 403, the interface module 21 transmits the input signal in the form of a network message to the control unit 14 ("ECU" in FIG. 4) The network message is sent by way of the communication network 60 and, in particular, by way of a network communication link 61 that links the interface module 21 to the control unit 14.

At step 404, the control unit 14 processes the input signal. As previously noted, the switch 341 is physically a momentary switch (i.e., a switch that closes when pressed but, when pressure is removed, automatically returns to an open position) but is made to emulate a latched switch (i.e., a switch that remains closed when pressed and returns to an open position only when pressed again). Accordingly, to process the input signal, the control unit 14 first determines that the switch 341 has experienced an off→on transition (i.e., because the switch 341 was previously off but is now on), and then determines that the present state of the rear scene lights 351 are off. Accordingly, at step 405, the control unit 14 generates a first control signal to turn on the rear scene lights 351, as well as a second control signal to turn on LED indicator 352.

At step 406, the control unit 14 transmits the first control signal in the form of a second network message to the interface module 35. The network message is sent by way of the communication network 60 and, in particular, by way of a network communication link 65 that links the central control unit 14 to the interface module 35. In practice, the network communication link 65 may utilize some or all of the same physical media utilized by the network communication link 61, depending on the network architecture that is utilized. In the illustrated embodiment a bus architecture is utilized, but it should be understood of course that other types of network architectures (such as ring or star architectures) may also be utilized.

At step 407, the interface module 35 transmits the first control signal to the rear lighting system 351. The control signal is transmitted in the form of a power control signal on a hardwired communication link 105. The hardwired communication link 105 may, for example, comprise a wire that connects a terminal of the switch 341 to an input terminal of the interface module 21. The power control signal from the interface module 35 has two states, namely, an "on" state in which power is provided to the lighting system 351 and an "off" in which power is not provided to the lighting system 351.

At step 408, the control unit 14 transmits the second control signal to the interface module 21 by way of the network communication link 61 in the form of a third network message. At step 409, the interface module 21 transmits the second control signal to the LED indicator 352 in the form of a power control signal on a hardwired communication link 102. As previously noted, the LED indicator 352 is located integrally with the switch 341 (e.g., at the tip of the lever of the switch 341, in a manner such that the LED is clearly associated with the switch 341). Therefore, when the second control signal is transmitted to the LED indicator 352, thereby turning on the LED indicator 352, the LED indicator provides feedback to the operator regarding the status of the rear scene lights 351. In the present situation, the on state of the LED indicator 352 indicates that the rear scene lights 351 are on.

When the switch 341 is released, another input signal (not shown) is sent to the interface unit 21 which indicates that the input state of the switch has changed from on to off. The control unit 14 recognizes the on→off transition, but ignores the transition pursuant to making the switch 341 emulate a latched switch.

It may be noted therefore that the switch 341 does not complete the electrical power circuit for the rear scene lights 351. When the switch 341 is released, the switch 341 opens but this change does not cause any change in the output status of the scene lights 351. The opportunity for the central control unit 14 to process the input signal from the switch 341 (as well as other input devices) makes the control system 12 more flexible and robust while at the same time reducing wiring and therefore reducing the number of failure points.

For example, a feature that is easily implemented in the control system 12 is two-way or, more generally, N-way switching. To implement N-way switching, it is only necessary to define N switches as inputs that control a given lighting system, and to program the control unit 14 to toggle the state of the lighting system every time the latched state of one of the N switches changes. A complicated and wiring-intensive N-way switching circuit is not required because the control logic required to implement N-way switching is not hardwired but rather is programmed into the control unit 14. Another feature that is easily implemented is progressive switching, in which the control unit 14 responds differently each time a given switch is pressed.

In addition to the advantages that are achieved due to the processing of the inputs, additional advantages are achieved in connection with processing the outputs. Thus, another advantage of the control system 12 is that the outputs are capable of multiple modes of operation, without any additional hardware, depending on the mode of operation of the vehicle. Thus, the same output device can have a digital mode of operation, an analog mode of operation, and a flashing mode of operation. For example, the same set of lights can be made to operate as high beam headlights at night (digital), as day-time running lights during the day (analog), and as flashing white lights in an emergency situation. (This is especially true if analog outputs are implemented using pulse width modulation to emulate a true analog-type output.) Because specialized hardware for each mode of operation is not required, it is much easier to provide any given output device with the ability to operate in different modes.

Another advantage with respect to the processing of outputs is that the central control unit 14 has the ability to synchronize or desynchronize different output devices. For example, in connection with the flashing emergency lights, it is possible to more precisely control the emergency lights and to have different lights flashing with exactly the same frequency but at a different phase. This prevents multiple sets of lights from undesirably turning on at the same time. For fire trucks with circuit breakers, this situation is undesirable because it can cause the current draw of the multiple sets of lights to trip a circuit breaker, thereby rendering the flashing emergency lights inoperative altogether.

Referring now to FIG. 5, the operation of the control system 12 to disengage the rear scene lights 351 in response to a changed interlock condition is illustrated. Federal Motor Vehicle Safety Standard (FMVSS) regulations prohibit the use of white lights on the back of a vehicle when the vehicle is moving forward. This regulation prevents other drivers from confusing the vehicle with oncoming traffic. Therefore, if a fire truck at the scene of a fire has white rear scene lights turned on and a firefighter decides to move the fire truck, the firefighter must first remember to turn off the white rear scene lights. FIG. 5 illustrates the operation of the control system to implement an interlock system 316 that eliminates the need for the firefighter to have to remember to turn off the rear scene lights in this situation.

To implement this type of control, a sensor 342 that monitors the status of the parking brake is utilized. The control rules governing the interlock condition for this example are then as follows. The rear scene lights 351 should disengage when the parking brake is disengaged. However, the rear scene lights are allowed to be on when the parking brake is off. Therefore, the rear scene lights are turned off only when there is an on→off transition of the parking brake and, otherwise, the rear scene lights are allowed to be on.

Accordingly, by way of example, the parking brake is turned off at step 501. At step 502, the parking brake sensor 342 transmits an input signal to the interface module 31. At step 503, the interface module 31 processes the input signal. For example, the interface module 31 performs debounce filtering to require stabilization of the mechanical state of the sensor before a state change is recognized.

At step 504, the interface module 31 transmits the input signal in the form of a network to the control unit 14 by way of a network communication link 67. At step 505, the control unit 14 processes the input signal. For example, the control unit 14 determines that the rear scene lights 351 are on, and that there has been an on→off transition in the state of the parking brake sensor 342. Accordingly, at step 506, the control unit 14 generates a first control signal to turn off the rear scene lights 351 and a second control signal to cause the LED indicator 352 to blink.

At step 507, the control unit 14 transmits the first control signal in the form of a network message to the interface module 35. In turn, at step 508, the interface module 35 transmits the control signal to the rear scene light lights 351, thereby causing the rear scene lights to turn off.

At step 509, the control unit 14 transmits the second control signal in the form of a network message to the interface module 21. In turn, at step 510, the interface module 35 transmits the control signal to the LED indicator 352, thereby causing the LED indicator 352 to blink. The blinking state of the LED indicator 352 indicates to the operator that the control unit 14 considers the switch 341 to be on, but that the rear scene lights 351 are nevertheless off because some other condition on the fire truck is not met. In this case, the rear scene lights 351 are off due to the on→off transition in the state of the parking brake. In this way, operator feedback is maximized.

The flow chart of FIG. 4, at step 510, shows the use of a single control signal to cause the LED indicator 352 to blink. In practice, the blinking of the LED indicator 352 may be achieved in a variety of ways. For example, if a simple hardwired connection between the interface module 21 and the LED indicator 352 is utilized, the interface module 21 may periodically provide periodic on and off control signals to the LED indicator 352 by periodically applying power to the output terminal that is connected to the LED indicator 352. Alternatively, if a blinker module is utilized, the interface module may provide a single control signal to the blinker module, which then controls blinking of the LED indicator 352.

If the operator then pushes and releases the switch 341a second time while the parking brake is off, the process in FIG. 4 is repeated and the rear scene lights 351 turn on. In this case, the rear scene lights 351 turn on even though the parking brake is off, because the control system 12 only prevents the rear scene lights from being on when the parking brake is first released. If the operator pushes and releases the switch 341a third time, the control system 12 turns off the rear scene lights 351.

b. Operation For Mission Critical Functions

Figure 6:
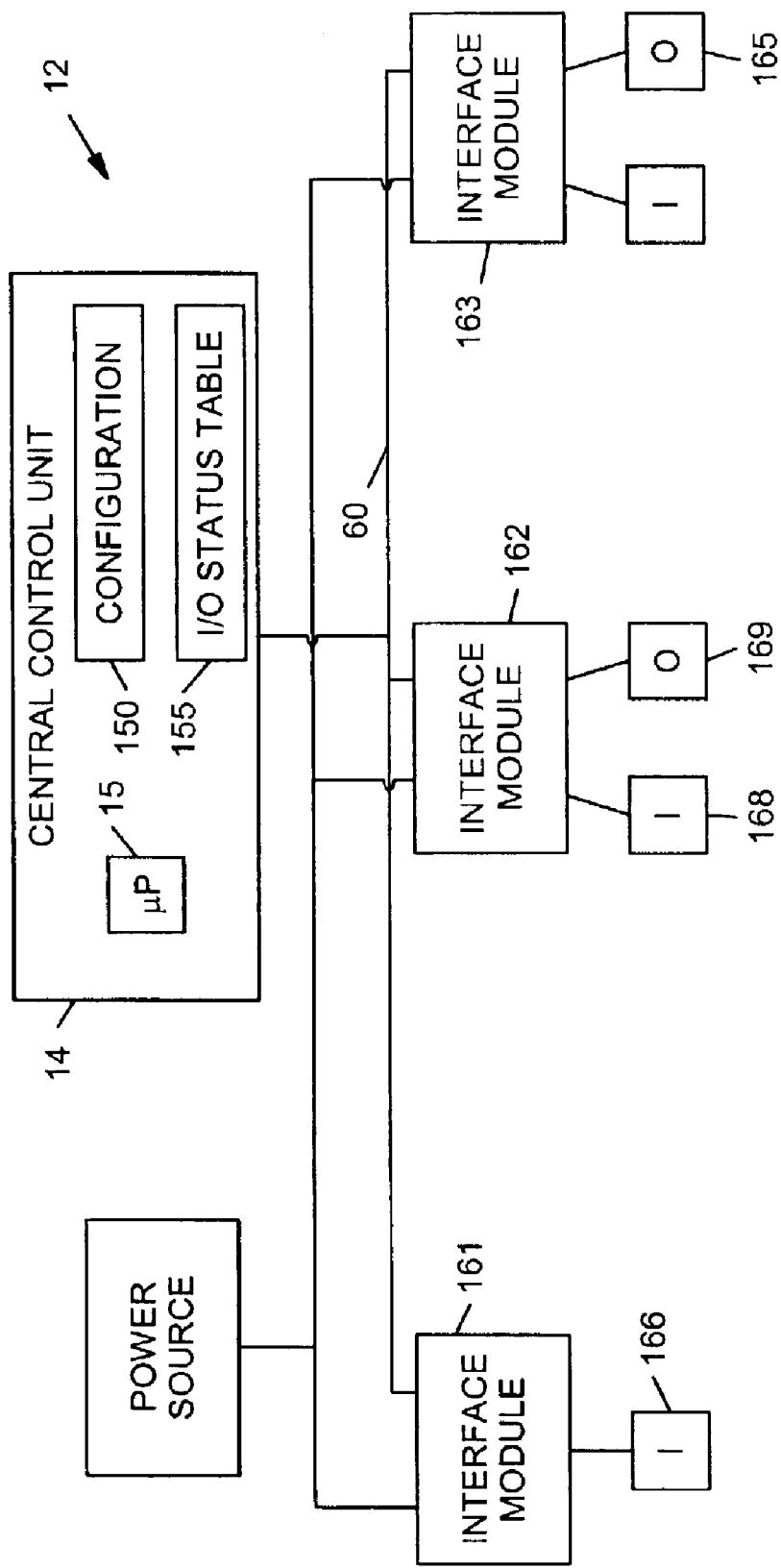
FIG. 6 is a simplified block diagram of the control system of FIGS. 1–2, where at least one of the interface module controls an output device that has been designated as controlling a mission critical function.
Figure 7:
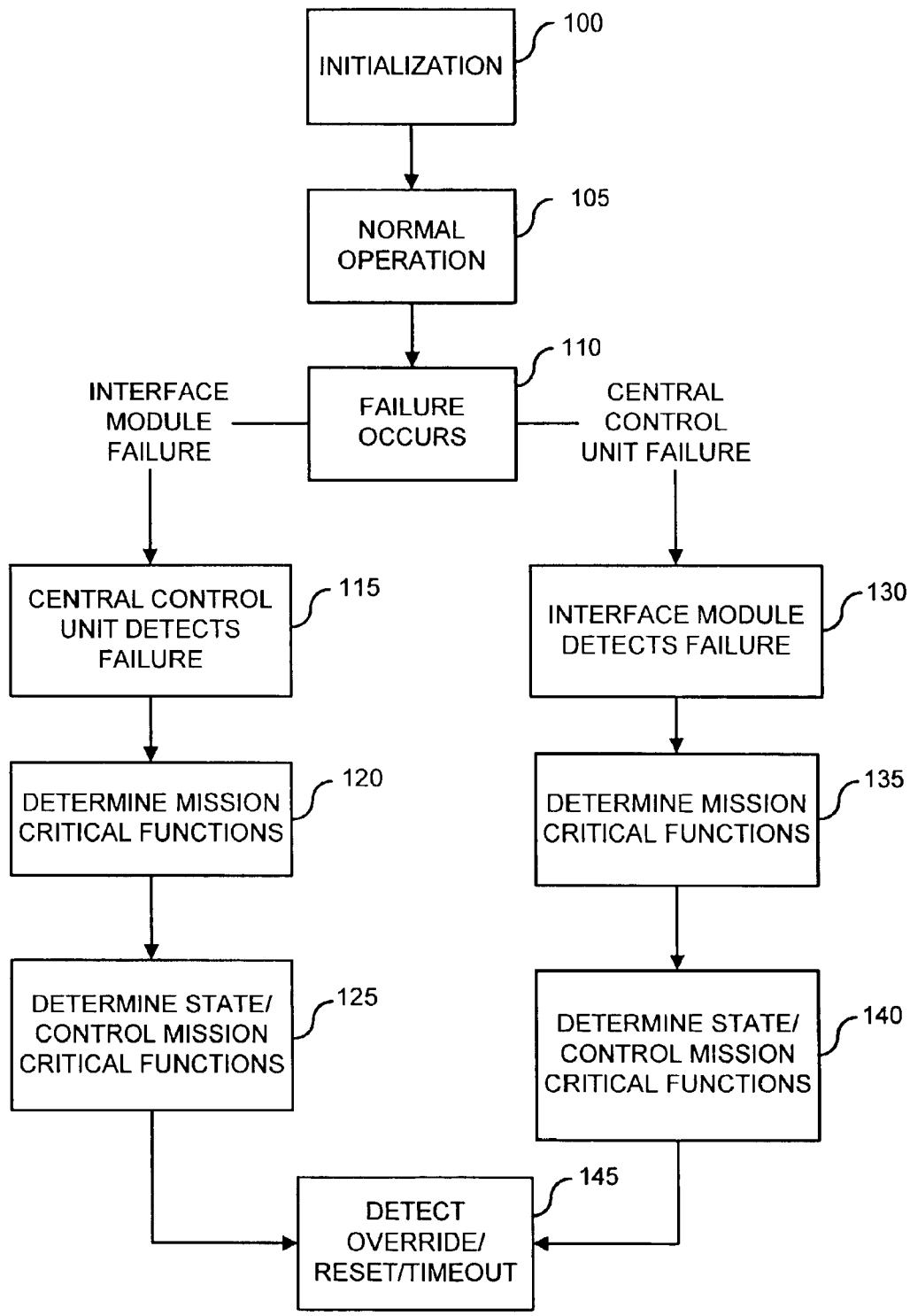
FIG. 7 is a flowchart showing the operation of the control system of FIG. 6, where at least one of the interface module controls an output device that has been designated as controlling a mission critical function.

Referring now to FIGS. 6 and 7, an example of the operation of control system 12 where control system 12 is configured to control at least one mission critical function in the event of a failure in system 12 is illustrated. A mission critical function is a function controlled by system 12 that should remain operable, despite one or more failures in system 12.

For example, fire truck 10 may provide a water pumping function. The water pumping function may utilize output devices associated with control system 12 to control pumping of water that is stored on the fire truck or water that is received through a fire hydrant or other source. The output devices that control the water pumping function can be designated as performing a mission critical function.

For example, a fire fighter may use a hose pumping water from fire truck 10 to extinguish flames in a burning building. At that point, fire truck 10 should continue pumping water independent of a failure in control system 12. Accordingly, control system 12 should be configured to continue to control the output devices to allow the water pumping function to operate independent of the failure in control system 12.

Control of a mission critical function may be dependent on the existence of one or more conditions. For example, prior to beginning pumping of the water in the example above, control system 12 may require that an interlock condition be satisfied. For example, prior to pumping water, control system 12 may require satisfaction of an interlock condition requiring that (1) the ignition be turned on, (2) the parking brake be activated and (3) the transmission be in fourth gear lock-up. The purpose of such an interlock is to prevent fire truck from accidentally pumping water, for example, while travelling down the road. Although control system 12 uses the interlock condition to control operation of the pumping function as a threshold condition, once the pumping function has begun, control system 12 should be configured to continue to control the output devices such that the water pumping function remains active independent of a failure in the control system 12.

Although water pumping has been described as an example of a mission critical function, any function can be designated as mission critical. Exemplary functions that may be mission critical can include headlights, emergency lighting, a fire control mechanism or weapon system on a military vehicle, etc. A mission critical function can be controlled using a single output from an interface module, multiple or all the outputs from an interface module, outputs from multiple interface modules, etc.

FIG. 6 is a block diagram of the control system 12, which has been simplified to the extent that some of the structure shown in FIGS. 1 and 2 is not shown in FIG. 6. FIG. 6 illustrates control system 12 where control unit 14 includes an updateable configuration file 150 that is processed and maintained by microprocessor 15 using control program 16. Configuration file 150 may be a type of data file, a program, hardwired connections, or any or device or data and may contain information or instruction sets describing how interface modules 161, 162, and 163 should process inputs and outputs. In configuration file 150, one or more output devices may be designated as being associated with a mission critical function. In the event of a failure in control system 12, these output devices keep the mission critical function active. Hereinafter, output devices that have been designated as controlling a mission critical function are referred to as mission critical output devices.

Interface modules 161, 162, and 163 may be configured to handle the same or different numbers and/or types of input devices and output devices. The interface modules may be configured to interface with only input devices, only output devices, or both input devices and output devices. The interface modules may further be configured to drive high-power or low-power loads. For simplicity, only three interface modules are shown, although control system 12 can be associated with as many interface modules as needed.

Referring now to FIG. 7, FIG. 7 illustrates operation of control system 12 in connection with mission critical functions. At step 100, an initialization step is performed where configuration file 150, designating output devices as controlling a mission critical function, is downloaded from the central control unit 14 to each interface module 30 (and each interface module 20) at power-up. Referring again to FIG. 6, configuration file 150 can be downloaded uniformly to each of interface modules 161, 162 and 163 over communication network 60. Alternatively, central control unit 14 can be configured to recognize the outputs associated with each interface module and only downloaded the relevant portions of the configuration file.

File 150 can be processed by the microprocessor in each interface module to determine whether any output devices associated with the interface module are mission critical output devices. According to an exemplary embodiment, interface module 163 controls an output device 165 that controls a water pumping function that has been designated as mission critical in configuration file 150. Although mission critical output device 165 is a single output device in this example, mission critical functions may require multiple output devices that may be provided by multiple interface modules.

Following step 100, normal operation of control system 12 occurs at step 105. During normal operation, the control system 12 is in a master-slave control configuration in which the central control unit 14 operates as a master controller and the interface modules 161, 162, and 163 operate as slave modules under the control of the central control unit 14. The central control unit 14 maintains an input/output status or state table 155 in memory. Input/output state table 155 stores the last known state of all inputs and outputs associated with control system 12. Input/output state table 155 is continuously updated during normal operation. According to one exemplary updating method, central control unit 14 periodically polls each of the interface modules 161, 162, and 163 associated with control system 12 to determine the current state of their inputs and outputs. According to another exemplary updating method, each of the interface modules 161, 162, 163 may transmit the current state of their inputs and outputs to the control unit 14 on a periodic basis (regardless whether any states have changed). Central control unit 14 then records these values in input/output state table 155 as the last known state.

According to another exemplary updating method, interface modules 161, 162, 163 notify the central control unit 14 upon changes in the I/O status data. Thus, when the interface module receives input data from an input device indicating a change of state, this change of state is communicated to central control unit 14 without waiting for polling and input/output state table 155 can be updated more quickly. Central control unit 14 then transmits new control signals or the change of state to the interface module or modules controlling an output device or output devices associated with the changed input. Central control unit 14 also updates input/output state table 155 to reflect the changes to last known state of the output devices based on the changed input.

Although the above steps are described in reference to a control system 12 including a central control unit 14, according to an alternative embodiment control system 12 can be implemented without a central control unit 14. According to this exemplary embodiment, the control functions, state table maintenance functions, and/or any other function described as being performed by central control unit 14 can be performed by the interface modules as described in U.S. Ser. No. 09/927,946.

At a step 110, a failure in control system 12 is detected. The failure can be caused by any of a variety of sources, such as an electrical failure, a mechanical failure, a communication failure, etc. Exemplary failures can include a communication network failure, an interface module failure, a power surge, etc. The failure may be detected by central control unit 14, e.g., where an interface module 161 monitoring input devices has failed or the communication network 60 has failed. Alternatively, the failure may detected by interface module 163, e.g., where central control unit 14 has failed, where the communication network 60 has failed, or in other situations where communication with the central control unit 14 is lost.

If the failure detected in step 110 is a failure associated with interface module 161 that monitors input device 166, this failure can be detected by central control unit 14 at step 115. The failure can be detected when central control unit 14 polls interface module 161 for the current state of input devices 166 and/or any output devices and does not receive a response. If a response is not received within a given time, a failure is presumed.

Upon failure, central control unit 14 makes a determination whether the state information from input devices 166 on interface module 161 are associated with mission critical output devices in a step 120. If input devices 166 are not associated with mission critical output devices, the output devices associated with the input device from interface module 161 will be placed in their default state, generally off.

If input devices 166 are associated with mission critical output devices, central control unit 14 will begin a mission critical operating state in a step 125 and consult the input/output state table to determine the last known state of the input devices 166. Thereafter, the mission critical output devices associated with the inputs from the failed interface module are maintained in their last known state based on the input/output state table. Using the water pumping example, if fire truck 10 is pumping water and input devices 166 associated with interface module 161 provide input data to control the water pumping function and interface module 161 fails, fire truck 10 will continue pumping water independent of the failure.

Referring back to step 110, if the failure in step 110 is a failure associated with central control unit 14 (or communication network 60), this failure can be detected by interface module 163 in a step 130. The failure may result in the central control unit 14 being reset, either manually or automatically. The failure can be detected when interface module 163 does not receive the expected polling for the input/output states or when the interface module otherwise detects that communication with the central control unit 14 has been lost.

When interface module 163 makes a determination that there is a failure in communication with central control unit 14, interface module 163 begins mission critical operation in which the interface module 163 operates autonomously. In this event, the other interface modules 161, 162 typically also lose communication with the central control unit and enter into autonomous operation, thereby causing the control system 12 to enter into a distributed control configuration. The interface module 163 makes a determination whether any of its output devices have been designated as mission critical in a step 135. If the output devices associated with interface module 163 have not been designated as controlling mission critical functions, the output devices will be placed in their default state, generally off. If the output devices are associated with a mission critical function, the output devices are maintained in their current state at step 140 which is based on commands received from the central control unit 14 prior to reset of the central control unit. In the above example, output device 165 continues to cause water to be pumped if water is already being pumped. The interface module 163 therefore remains operational even if the central control unit 14 is in the process of resetting.

Alternatively, when input can be received from input devices independent of central control unit 14, e.g., where the input devices associated with an interface modules control an output device that is also associated with the interface module, the output device can be controlled directly by the input devices. For example, in FIG. 6, output device 169 can be controlled based on input device 168 because they are both connected to the same interface module 162. This type of operation can be performed regardless of whether the output device is a mission critical output device (assuming I/O status information from other interface modules is not also used to control the output device). Further, where the interface module can receive input from an alternative source independent of central control unit 14, such as in an exemplary embodiment where the interface module are interconnected on communication network 60, the output device can be configured based on the alternative inputs.

During mission critical operation in step 125 or step 140, where central control unit 14 or interface module 163 is maintaining the current state of a mission critical output device, central control unit 14 or interface module 163 operates the mission critical output device in the last known state until an event occurs to end the mission critical operating state in a step 145. The event can include receiving an override, a timeout timer lapsing, a reset, a resolution of the failure condition, etc.

For example, a failed interface module 161 that was controlling the mission critical inputs can become active again, because an error condition in control system 12 has been resolved, because the central control unit has finished resetting, through repair, replacement, or any other event such that central control unit 14 can once again receive inputs from this module and resume normal operation.

Further, a timeout condition can occur. The timeout condition can be implemented in control program 16 in central control unit 14 and can be varied dependent on the mission critical function. For example, for a water pumping function, a timeout might not be used to allow water to continue pumping until a manual override is performed. Alternatively, for a aerial unit movement function, described below with reference to FIG. 8, the timeout condition can be a few seconds since it may be undesirable to continue movement of the aerial unit in any one direction without control.

Another event can include a actuation of a reset switch that will reset central control unit 14 or interface module 163. Upon receipt of reset indication, control program 16 can force all outputs to resume their default state.

The failure can be associated with central control unit 14, requiring that central control unit be replaced or reset. When central control unit 14 is reset or replaced, input/output state table 155 in central control unit 14 is not be an accurate representation of the current state of the input and output devices for control system 12 and is preferably reconstructed. In some situations, it may be desirable to derive the intended input state of certain input device based on pre-existing I/O status data. For example, some inputs may be received from momentary switches, i.e., switches that transmit a signal upon actuation of the switch but do not physically remain in a particular state. For such input devices, central control unit 14 may implement a latch function which causes the switch to operate like a non-momentary switch, but which also allows the state of the switch to be reset in firmware. To implement this function, the central control unit 14 stores a representative input state of the momentary switch which is representative of an actuated position of the momentary switch.

According to an exemplary embodiment, in the event of a failure condition associated with the central control unit 14, the original (pre-fault condition) representative/latched input state for such switches is preferably determined after the failure condition is resolved. Otherwise, the underdetermined values of such momentary switches or other momentary input devices may interfere with mission critical functions in an interface module. Accordingly, in an exemplary embodiment, the interface modules can be configured to recognize an interruption in communication with central control unit 14 and/or a reset of central control unit 14. Further, the interface modules can be configured to recognize that the mission critical output devices should not be reset to default values, rather the input/output state table 155 in central control unit 14 should be updated to reflect the correct input/output values at the interface module to maintain the current state for the mission critical function.

For example, where an interface module controls a mission critical output device and there is a failure in control system 12, a current state of inputs and outputs can be maintained independent of the receipt of reset inputs and outputs. The state of the mission critical output devices in combination with the values on all other inputs and outputs can be referred to as a current state of the interface module. In the event of a central control unit 14 failure, the current state of the interface module or the state of the mission critical output device can be communicated to central control unit 14 and input/output state table 155 can be updated accordingly. To this end, the interface modules 161, 162, 163 are preferably programmed to provide the central control unit 14 with I/O status information sufficient for the central control unit to determine the representative input states of the momentary switches prior to reset of the central control unit. Such information may include output states sufficient to "reverse engineer" the original input states, a duplicate copy of the I/O status information for a particular interface module (i.e., assuming the local I/O status information is also stored at the particular interface module), or other information.

Figure 8:
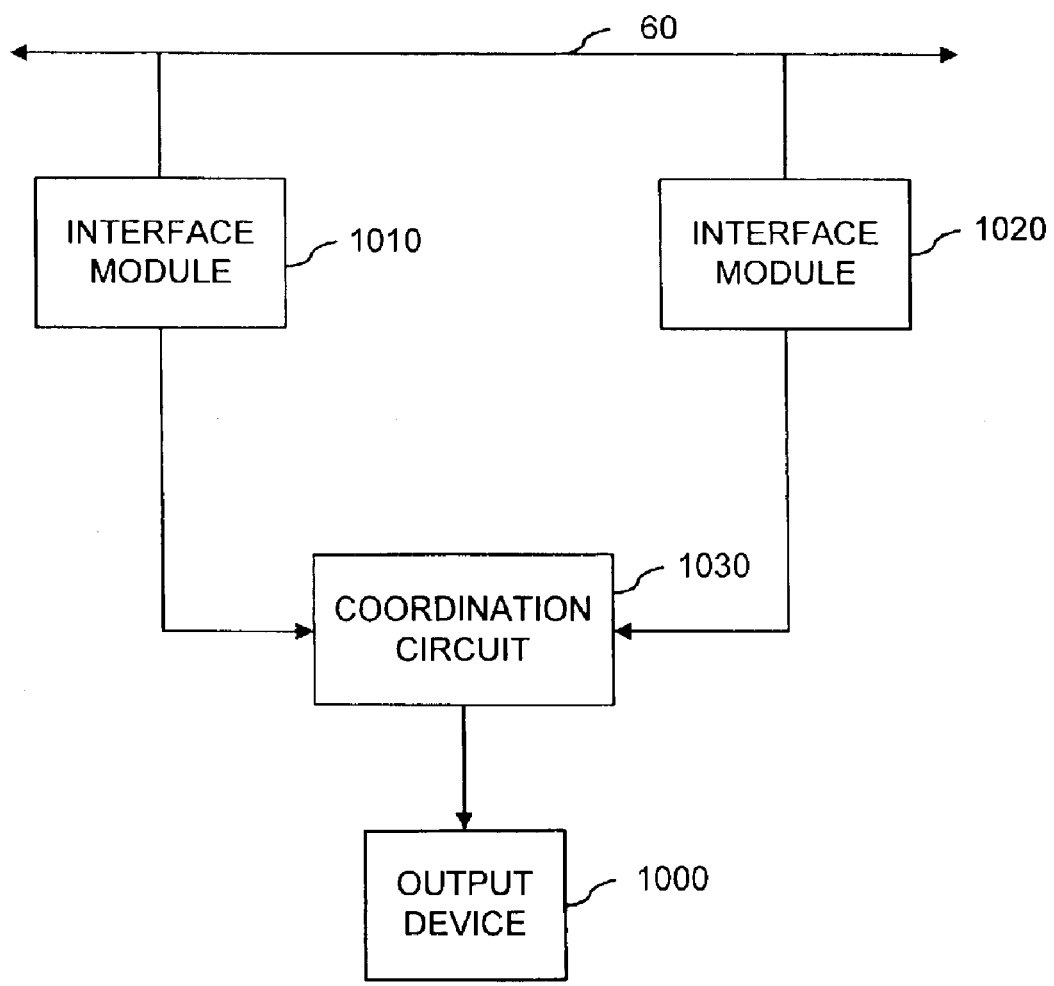
FIG. 8 is a block diagram illustrating multiple interface modules configured to control an output device for use in the control system of FIGS. 1–2.

Referring now to FIG. 8, FIG. 8 is a block diagram illustrating multiple interface modules configured to control an output device 1000 for use in control system 12, according to another embodiment. Specifically, FIG. 8 illustrates a portion of control system 12 in which, for a mission critical output device 1000, the output device can be controlled from either a first interface module 1010 or a second interface module 1020.

According to an exemplary embodiment, if an output device is a mission critical output device, the output device may be connected to more than one interface module. If one interface module is damaged, the mission critical output device may continue to function under the control of the other interface module.

According to one exemplary embodiment, interface modules 1010 and 1020 decide between themselves which interface modules is responsible for controlling the output device 1000 based on communication between first interface module 1010 and second interface module 1020. First interface module 1010 and second interface module 1020 are coupled to communication network 60 such that messages can be exchanged between the interface modules to coordinate control of mission critical output module 1000. For example, first interface module 1010 may control mission critical output device 1000 during normal operations and second interface module 1020 may control mission critical output device 1000 in the event of a failure associated with first interface module 1010. Such a failure may be detected, for example by second interface module 1020 based on loss of communication with first interface module 1010. In addition to controlling mission critical output device 1000, first interface module 1010 and second interface module 1020 may be further configured to control additional output devices in the same manner.

Alternatively, a circuit 1030, shown in FIG. 8, may be used which receives two inputs and combines the inputs according to a logic configuration to provide a single output.

For example, synchronization circuit can include a logic configuration configured to operate in the same manner as a logical "OR" gate.

3. Aerial Control

Figure 9:
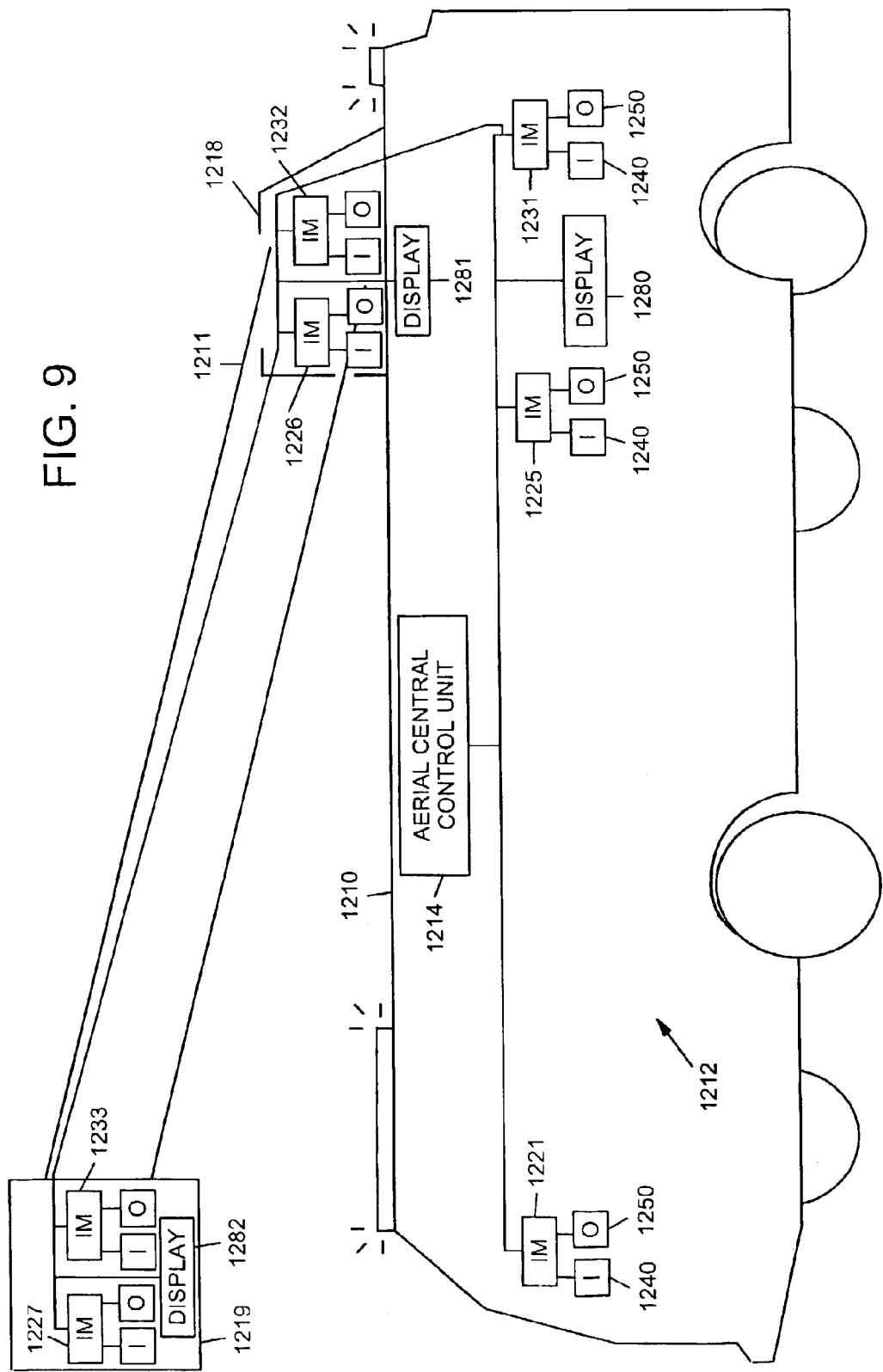
FIG. 9 is a schematic view of an aerial device having a control system according to another embodiment of the present invention.
Figure 10:
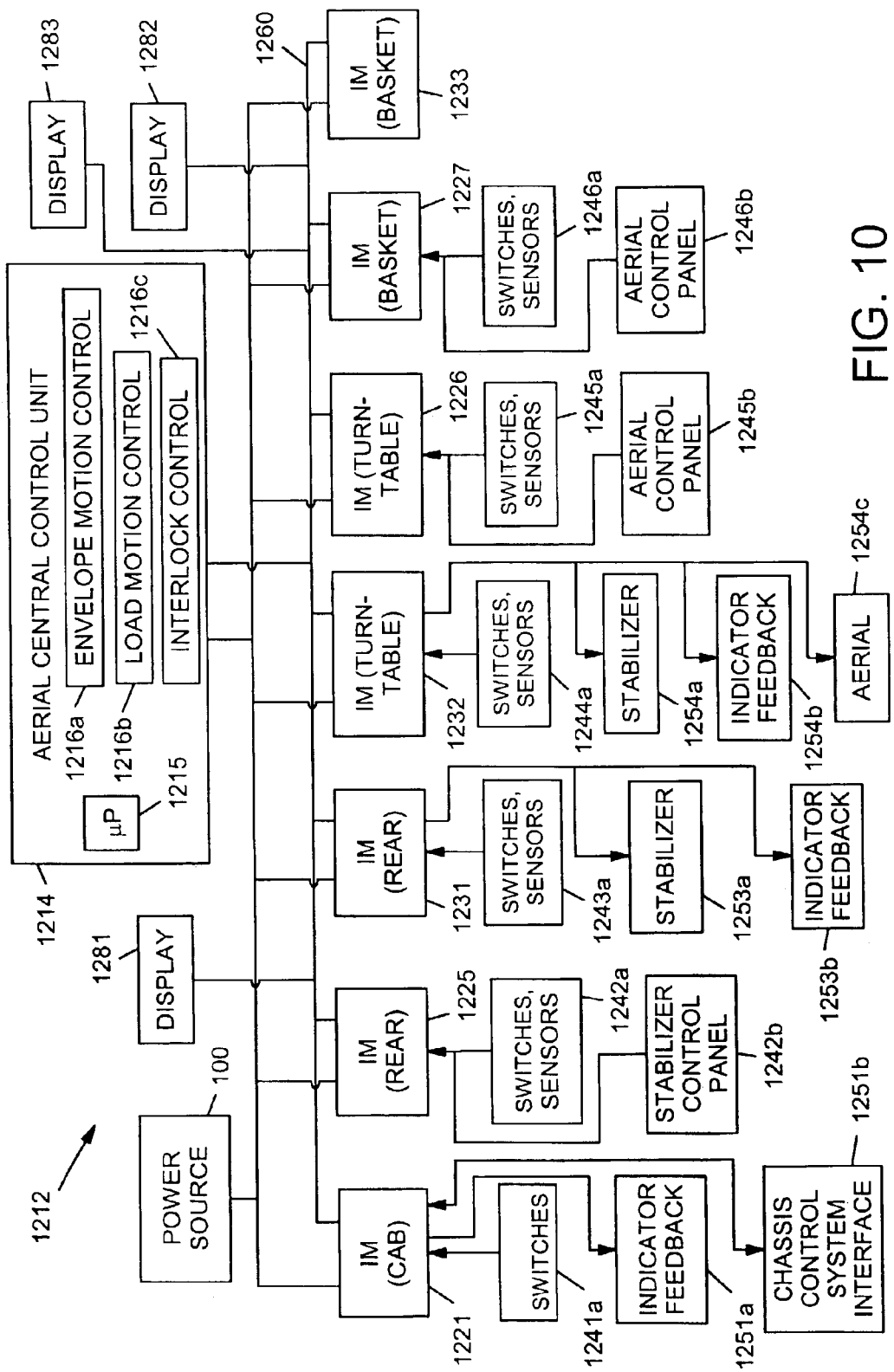
FIG. 10 is a more detailed block diagram of the control system of FIG. 8.

Referring now to FIGS. 9 and 10, a preferred embodiment of a fire truck 1210 with an aerial 1211 having an aerial control system 1212 is illustrated. By way of overview, the control system 1212 comprises an aerial central control unit 1214, a plurality of microprocessor-based interface modules 1220, 1230 and 1235, a plurality of input devices 1240, and a plurality of output devices 1250. The central control unit 1214 and the interface modules 1220, 1230 and 1235 are connected to each other by a communication network 1260.

The control system 1212 is similar in most respect to the control system 12, with the primary difference being that the control system 1212 is used to control the output devices 1250 on the aerial 1211 based on input status information from the input devices 1240, rather than to control the output devices 50 on the chassis 11. The interface modules 1220 and 1230 may be identical to the interface modules 20 and 30, respectively, and the central control unit 1214 may be identical to the central control unit 14 except that a different control program is required in connection with the aerial 1211. Accordingly, the discussion above regarding the interconnection and operation of the interface modules 20 and 30 with the input devices 40 and output devices 50 applies equally to the central control unit 1214, except to the extent that the control system 1212 is associated with the aerial 1211 and not with the chassis 11.

The aerial control system 1212 also includes the interface modules 1225-27, which are similar to the interface modules 20 and 30 except that different I/O counts are utilized. In one preferred embodiment, the interface modules 1225-27 have twenty-eight switch inputs (two of which are configurable as frequency inputs). As previously noted, rather than using several different types of interface modules, it may be desirable to use only a single type of interface module in order to reduce inventory requirements. Additionally, the number of interface modules and the I/O counts are simply one example of a configuration that may be utilized.

It is desirable to use a control system 1214 for the aerial 1211 which is separate from the control system 12 in order to provide a clear separation of function between systems associated with the aerial 1211 and systems associated with the chassis 11. Additionally, as a practical matter, many fire trucks are sold without aerials and therefore providing a separate aerial control system enables a higher level commonality with respect to fire trucks that have aerials and fire trucks that do not have aerials.

A specific example will now be given of a preferred interconnection of the interface modules with a plurality of output devices 1240 and 1250. The interface module 1221 receives inputs from switches 1241a which may include for example an aerial master switch that activates aerial electrical circuits, an aerial PTO switch that activates the transmission to provide rotational input power for the hydraulic pump, and a platform leveling switch that momentarily activates a platform (basket) level electrical circuit to level the basket relative to the current ground grade condition. The LED indicators 1251 provide visual feedback regarding the status of the inputs switches 1241a.

The interface modules 1225 and 1231 are located near a ground-level control station at a rear of the fire truck 10. The interface modules 1225 and 1231 receive inputs from switches 1242a and 1243a that include, for example, an auto level switch that activates a circuit to level the fire truck using the stabilizer jacks and an override switch that overrides circuits for emergency operation. The interface modules 1225 and 1231 may also receive inputs from an operator panel such as a stabilizer control panel 1242b, which includes switches that control the raising and lowering of front and rear stabilizer jacks, and the extending and retracting of front and rear stabilizer jacks. The stabilizer is an outrigger system which is deployed to prevent the fire truck from becoming unstable due to the deployment of an aerial system (e.g., an eighty-five foot extendable ladder). The interface module 1231 may drive outputs that are used to control deployment the stabilizer, which can be deployed anywhere between zero and five feet.

The interface modules 1226 and 1232 are located near a turn table 1218 at the rear of the fire truck 10. The interface modules may receive inputs from switches 1244a and 1245a, as well as switches that are part of an aerial control panel 1245b and are used to control the extension/retraction, raising/lowering, and rotation of the aerial 1211. The interface modules 1226 and 1232 drive outputs that control the extension/retraction, raising/lowering, and rotation of the aerial 1211, as well as LED indicators 1254b that provide operator feedback regarding the positions of switches and other I/O status information. The interface modules 1227 and 1233 are located in the basket of the aerial and provide duplicate control for the extension/retraction, raising/lowering, and rotation of the aerial.

Additional inputs and outputs 1251b may be used to establish a communication link between the control system 12 and the control system 1212. In other words, the digital on/off outputs of one control system can be connected to the switch inputs of the other control system, and vice versa. This provides for a mechanism of transferring I/O status information back and forth between the two control systems 1211 and 1212. Alternatively, a J1939 or other communication network may be used to establish a communication link between control systems 12 and 1212.

The control system 1214 has complete motion control of the aerial 1211. To this end, the control program 1216 includes an envelope motion controller 1216a, load motion controller 1216b and interlock controller 1216c. Envelope motion control refers to monitoring the position of the aerial and preventing the aerial from colliding with the remainder of the fire truck 10, and otherwise preventing undesirable engagement of mechanical structures on the fire truck due to movement of the aerial. Envelope motion control is implemented based on the known dimensions of the aerial 1211 and the known dimensions and position of other fire truck structures relative to the aerial 1211 (e.g., the position and size of the cab 17 relative to the aerial 1211) and the position of the aerial 1211 (which is measured with feedback sensors 1244a and 1245a). The control system 1212 then disallows inputs that would cause the undesirable engagement of the aerial 1211 with other fire truck structures.

Load motion control refers to preventing the aerial from extending so far that the fire truck tips over due to unbalanced loading. Load motion control is implemented by using an appropriate sensor to measure the torque placed on the cylinder that mechanically couples the aerial 1211 to the remainder of the fire truck. Based on the torque and the known weight of the fire truck, it is determined when the fire truck is close to tipping, and warnings are provided to the operator by way of text messages and LED indicators.

Interlock control refers to implementing interlocks for aerial systems. For example, an interlock may be provided that require the parking brake be engaged before allowing the aerial to move, that require the stabilizers to be extended and set before moving the aerial 1211, that require that the aerial PTO be engaged before attempting to move the aerial, and so on.

Advantageously, therefore, the control system makes the operation of the aerial much safer. For example, with respect to load motion control, the control system 1212 automatically alerts firefighters if the extension of the aerial is close to causing the fire truck to tip over. Factors such as the number and weight of people in the basket 1219, the amount and weight of equipment in the basket 1219, the extent to which the stabilizers are deployed, whether and to what extent water is flowing through aerial hoses, and so on, are taken into account automatically by the torque sensors associated with the cylinder that mounts the aerial to the fire truck. This eliminates the need for a firefighter to have to monitor these conditions manually, and makes it possible for the control system 1212 to alert an aerial operator to unsafe conditions, and puts less reliance on the operator to make sure that the aerial is operating under safe conditions.

In another embodiment, the portion of the communication network that connects the interface modules 1227 and 1233 to the remainder of the control system 1212 may be implemented using a wireless link. The wireless link may be implemented by providing the interface modules 1227 and 1233 with wireless RF communication interfaces such as a Bluetooth interfaces. A wireless link may be advantageous in some instances in order to eliminate maintenance associated with the network harness that extends from the main vehicle body along the articulated arm formed by the aerial 1211 to the interface modules 1227 and 1233. Also, given that portions of the network harness can be positioned at significant distances from the center of gravity of the vehicle 10, the use of a wireless link is advantageous in that it reduces the weight of the articulated arm, thereby enhancing the mechanical stability of the vehicle. In this regard, it may also be noted that it is possible to provide all of the interface modules on the vehicle 10 with the ability to communicate wirelessly with each other (e.g., using Bluetooth), thereby completely eliminating the need for a separate network harness.

4. Additional Aspects

From the foregoing description, a number advantages of the preferred fire truck control system are apparent.

Because the control system includes output devices that have been designated as controlling a mission critical function that will not be interrupted based on a failure of the central control unit or the interface module providing inputs, firefighter safety is enhanced. When a firefighter is fighting fires, the firefighter is able to more fully concentrate on fighting the fire and less on having to worry about failure of an output device controlling a mission critical function.

Additionally, the interface modules are interchangeable units. In the disclosed embodiment, the interface modules 20 are interchangeable with each other, and the interface modules 30 are interchangeable with each other. The mission critical designations can be downloaded from the central control unit to a newly replaced interface module, such that the new interface module will recognize whether any output devices associated with it have been designated as controlling a mission critical function.

Further, if a greater degree of interchangeability is required, it is also possible to use only a single type of interface module. If the control system were also applied to other types of equipment service vehicles (e.g., snow removal vehicles, refuse handling vehicles, cement/concrete mixers, military vehicles such as those of the multipurpose modular type, on/off road severe duty equipment service vehicles, and so on), the interface modules would even be made interchangeable across platforms since each interface module views the outside world in terms of generic inputs and outputs, at least until configured by the central control unit. Because the interface modules are interchangeable, maintainability is enhanced. An interface module that begins to malfunction due to component defects may be replaced more easily. On power up, the central control unit downloads configuration information to the new interface unit, and the interface unit becomes fully operational. This enhances the maintainability of the control system.

Because the interface modules are microprocessor-based, the modules do not rely on the central control unit to control output devices controlling a mission critical function. Accordingly, in the event of a failure of the central control unit or the communication link between the central control unit and the interface module, the interface module can recognize whether it controls output devices designated as controlling a mission critical function and can continue to control that mission critical function independent of the failure.

Many other changes and modifications may be made to the present invention without departing from the spirit thereof. The scope of these and other changes will become apparent from the appended claims.

What is claimed is:

1. An interface module for a power distribution and control system for a vehicle, comprising at least one first link configured to receive an input from input devices on the vehicle;

at least one second link configured to control output devices on the vehicle;

at least one third link configured to communicate with a communication network; and control logic configured to store a record of output devices associated with the interface module and to process a configuration file to determine whether any of the output devices have been designated as controlling a mission critical functions, wherein the control logic is configured to control the output devices based on signals received from the third link and wherein the control logic is configured to detect a failure condition in which signals are not being received by the interface module over the third link and to place output devices that have not been designated as mission critical in a default operating state.

2. An interface module according to claim 1, wherein the configuration file is received over the third link during an initialization phase.

3. An interface module according to claim 1, wherein the control logic is configured to control the output devices based on input signal received from the input devices, and wherein the input devices are linked to the interface module.

4. An interface module according to claim 1, wherein the control logic is configured to maintain the operating state of an output device that has been designated as controlling a mission critical function in the same state as prior to detection of the failure condition.

5. An interface module according to claim 4, wherein the operating state of the output device that has been designated as controlling the mission critical function corresponds to continued operation of the mission critical function.

6. An interface module according to claim 1, wherein the control logic receives input signals from the third link following detection of the failure condition and, in response, transmits the current operating state of the output devices that have been designated as controlling a mission critical function over the third link.

7. A control method for a vehicle, comprising:
- determining that a failure has occurred in a power distribution and control system having a plurality of interface modules that control output devices located on a vehicle and are coupled to a communication network in which signals are not being received by the interface module over the communication network;
- determining whether any output devices controlled by one of the plurality of interface modules have been designated as controlling a mission critical function;
- placing output devices that have not been designated as mission critical in a default operating state; and
- controlling at least one output device in accordance with the last known state of the output device based on the determination that a failure has occurred and the determination that the output device has been designated as controlling a mission critical function.

8. A control method according to claim 7, wherein controlling the at least one output device in accordance with the last known state of the output device includes operating the output device to provide the mission critical function.

9. A control method according to claim 7, further including detecting that the failure has been resolved and transmitting the last known state of the at least one output device.

10. A control method according to claim 7, further including setting the state of an input device based on the last known state of the at least one output device.

11. A vehicle, comprising:
- a power distribution and control system, the power distribution and control system further including
  - (A) a plurality of input devices;
  - (B) a plurality of output devices;
  - (C) a communication network;
  - (D) a plurality of microprocessor-based interface modules, the plurality of interface modules being coupled to the plurality of input devices and to the plurality of output devices by way of respective dedicated communication links; and
  - (E) a microprocessor-based control unit, the control unit being coupled to the plurality of interface modules by way of the communication network, the control unit including a control program that is executable by a microprocessor of the control unit to control the plurality of output devices based on input status information from the plurality of input devices,
- wherein at least one of the plurality of interface modules is configured to control an output device designated as controlling a mission critical function, such that the output device will function according to its last known state prior to a failure, wherein the control logic is configured to control the output devices based on signals received from the communication network, and wherein the control logic is configured to detect a failure condition in which signals are not being received by the interface module over the communication network and to place output devices that have not been designated as mission critical in a default operating state.

12. A vehicle according to claim 11, wherein the failure is a failure associated with the microprocessor based control unit.

13. A vehicle according to claim 11, wherein the failure is a failure associated with an interface module that receives input data from input devices for control of the output device designated as controlling a mission critical function.

14. A vehicle according to claim 13, wherein the plurality of interface modules are physically and functionally interchangeable with other interface modules.

15. A vehicle according to claim 11, wherein the vehicle is a fire truck and wherein the mission critical function is a water pumping function.

16. A vehicle according to claim 11, wherein the plurality of interface modules are physically and functionally interchangeable with other interface modules.

17. A vehicle according to claim 11, wherein the control unit stores and maintains a configuration file that designates at least one output device as controlling a mission critical function.

18. A vehicle according to claim 17, wherein the configuration file is transmitted to the plurality of interface modules during an initialization phase for the power distribution and control system.

19. A vehicle according to claim 18, wherein each of the plurality of interface modules are configured to process the configuration file to determine whether an output device associated with that interface module has been designated as controlling a mission critical function.

20. A vehicle according to claim 11, wherein the plurality of microprocessor-based interface modules includes a first interface module coupled to a second interface module through the communication network, wherein control of at least one output device is shared between the first interface module and the second interface module.

21. A vehicle according to claim 20, wherein the first interface module is configured to control the at least one shared control output device during normal operation.

22. A vehicle according to claim 21, wherein the second interface module is configured to control the at least one shared control output device following detection of a failure condition.

23. A control method for a vehicle, comprising:
- (A) providing a vehicle power distribution and control system,
  - (1) wherein the vehicle power distribution and control system comprises (a) plurality of input devices, (b) a plurality of output devices, (c) a central control unit, and (d) a plurality of interface modules,
  - (2) wherein the central control unit is connected to the plurality of interface modules by way of a communication network,
  - (3) wherein the plurality of interface modules collect data from the plurality of input devices and distribute power to the plurality of output devices;
- (B) performing the following steps at the central control unit during initialization of the vehicle distribution and control system, including
  - (1) accessing a configuration file associated with the central control unit, wherein the configuration file designates at least one of the plurality of output devices as controlling a mission critical function,
  - (2) transmitting the configuration file or a portion thereof to each of the plurality of interface modules, wherein each interface module is configured to recognize whether an associated output device has been designated as controlling a mission critical function; and
- (C) repetitively performing the following steps at the interface modules during operation of the vehicle distribution and control system, including
  - (1) receiving control information at each interface module from the central control unit to control the operation of the output devices associated with that interface module, and (2) detecting at each interface module whether communication is not being received from the central control unit, wherein a communication failure occurs in which communication is not received from the central control unit, the interface module enters a mission critical mode of operation, including
    determining whether any output device associated with the interface module has been designated as controlling a mission critical function, and
        if it is determined that an output device has been designated as controlling a mission critical function, maintaining the state of that output device according to the control information last received from the central control unit prior to the communication failure.

24. A method according to claim 23, wherein if the interface module determines that an output device has not been designated as controlling a mission critical function, the interface module places the output device in a default state.

25. A method according to claim 23, further comprising configuring the interface module to continue to attempt to detect communication from the central control unit after the communication failure.

26. A method according to claim 25, further comprising:
    detecting resumed communication from the central control unit at an interface module after the communication failure,
    determining that the interface module had an output device that was designated as controlling a mission critical function, and
    transmitting from the interface module to the central control unit information indicating that a mission critical function is being provided and input and output state information associated with the mission critical function.

27. A control method for a vehicle, comprising:
(A) providing a vehicle power distribution and control system,
    (1) wherein the vehicle power distribution and control system comprises (a) plurality of input devices, (b) a plurality of output devices, (c) a central control unit, and (d) a plurality of interface modules,
    (2) wherein the central control unit is connected to the plurality of interface modules by way of a communication network,
    (3) wherein the plurality of interface modules collect data from the plurality of input devices and distribute power to the plurality of output devices;
(B) performing the following steps at the central control unit during initialization of the vehicle distribution and control system, including
    (1) accessing a configuration file stored in a memory associated with the central control unit, wherein the configuration file designates at least one of the plurality of output devices as controlling a mission critical function,
    (2) transmitting the configuration file or a portion thereof to each of the plurality of interface modules, wherein each interface module is configured to recognize whether an associated output device has been designated as controlling a mission critical function; and
(C) repetitively performing the following steps at the central control unit during operation of the vehicle distribution and control system, including
    (1) receiving input status information at the central control unit from each interface module to control the operation of the output devices associated with that interface module, and
    (2) detecting at the central control unit whether communication is not being received from an interface module, wherein if a communication failure occurs in which communication is not being received from the interface module, the central control unit enter a missions critical mode of operation, including
        determining whether any input device associated with the interface module that is no longer communicating with the central control unit is an input device associated with an output device that has been designated as controlling a mission critical function, and
        if it is determined that the interface module that is no longer communicating provided input status information associated with an output device that has been designated as controlling a mission critical function, maintaining the state of that output device according to the input status information last received from the interface module prior to the communication failure.

28. A method according to claim 27, wherein if the central control unit determines that the input status information formerly received from the interface module that is no longer communicating with the central control unit, the central control unit places output devices associated with the input status information in a default operating state.

29. A method according to claim 27, further comprising configuring the central control unit to continue to attempt to detect input status information from the interface module after the communication failure.

30. A method according to claim 29, further comprising:
    detecting input status information from an interface module at the central control unit after the communication failure, and
    determining that the input status information transmitted from the interface module is associated with an output device that is designated as controlling a mission critical function, and
    controlling the output device designated as controlling a mission critical function according to the detected input status information.

31. A method according to claim 27, further comprising maintain an input/output state table at the central control unit containing state information for the plurality of input devices and the plurality of output devices.

32. A method according to claim 31, further including configuring the central control unit to periodically request input and output status information from the plurality of interface modules.

33. A vehicle control system, comprising:
(A) a plurality of input devices;
(B) a plurality of output devices;
(C) a communication network;
(D) a plurality of microprocessor-based interface modules, the plurality of interface modules being coupled to the plurality of input devices and to the plurality of output devices by way of respective dedicated communication links;
(E) a microprocessor-based central control unit, the central control unit being coupled to the plurality of interface modules by way of the communication network, the control unit including a control program that is executable by a microprocessor of the control unit to control the plurality of output devices based on input status information from the plurality of input devices; and wherein the vehicle control system is capable of being placed into a first configuration during a normal mode of operation and into a second configuration during a fault mode of operation;

wherein the first configuration is a master-slave control configuration in which the central control unit operates as a master controller and the interface modules operate as slave modules under the control of the central control unit; and wherein the second configuration is a distributed control configuration in which the interface modules operate based on commands received from the central control unit prior to reset of the central control unit.

34. A vehicle control system according to claim 33, wherein each of the interface modules is programmed to enter the distributed control configuration responsive to occurrence of a fault condition that causes the interface module to lose communication with the central control unit.

35. A vehicle control system, comprising:

(A) a plurality of input devices;

(B) a plurality of output devices;

(C) a communication network;

(D) a plurality of microprocessor-based interface modules, the plurality of interface modules being coupled to the plurality of input devices and to the plurality of output devices;

(E) a microprocessor-based central control unit, the central control unit being coupled to the plurality of interface modules by way of the communication network, the control unit including a control program that is executable by a microprocessor of the control unit to control the plurality of output devices based on input status information from the plurality of input devices; and wherein, during normal operation, the control system has a master-slave configuration in which the central control unit operates as a master controller and the interface modules operate as slave modules under the control of the central control unit;

wherein, if the central control unit is reset due to a fault condition, the interface modules are programmed to enter an autonomous mode of operation in which each respective interface module controls at least some of the plurality of output devices to which the respective interface is connected based on commands received from the central control unit prior to reset of the central control unit.

36. A control system according to claim 35, wherein at least some of the plurality of input devices comprise momentary switches;

wherein, for each momentary switch, after the momentary switch is actuated by an operator, the control system stores a representative input state of the momentary switch which is representative of an actuated position of the momentary switch; and wherein, after reset of the central control unit, the interface modules are programmed to provide the central control unit with sufficient information for the central control unit to determine the representative input states of the momentary switches prior to reset of the central control unit.

* * * * *